United States Patent
Frailong et al.

(10) Patent No.: US 6,496,858 B1
(45) Date of Patent: Dec. 17, 2002

(54) REMOTE RECONFIGURATION OF A SECURE NETWORK INTERFACE

(75) Inventors: Jean-Marc Frailong, Palo Alto; Charles A. Price, San Jose; Joseph John Tardo, Palo Alto, all of CA (US)

(73) Assignee: Tut Systems, Inc., Pleasanton, CA (US)

( * ) Notice: Subject to any disclaimer, the term of this patent is extended or adjusted under 35 U.S.C. 154(b) by 0 days.

(21) Appl. No.: 09/435,014

(22) Filed: Nov. 5, 1999

Related U.S. Application Data

(62) Division of application No. 08/892,301, filed on Jul. 14, 1997, now Pat. No. 6,073,172.

(51) Int. Cl.[7] ............................................. G06F 15/177
(52) U.S. Cl. .................. 709/221; 709/217; 709/219; 709/220; 709/222; 713/100; 713/200; 713/201; 713/202; 712/15
(58) Field of Search .............................. 709/200, 201, 709/202, 203, 217, 219, 220, 221, 222; 712/15; 713/100, 201, 200, 202

(56) References Cited

U.S. PATENT DOCUMENTS

| | | |
|---|---|---|
| 5,144,664 A | 9/1992 | Esserman et al. |
| 5,155,847 A | 10/1992 | Kirouac et al. |
| 5,564,051 A | 10/1996 | Halliwell et al. |
| 5,671,355 A | 9/1997 | Collins |
| 5,689,640 A * | 11/1997 | Okanoue ............... 709/221 |
| 5,699,350 A | 12/1997 | Kraslavsky |
| 5,717,756 A | 2/1998 | Coleman |
| 5,752,042 A * | 5/1998 | Cole et al. ............. 395/712 |
| 5,768,528 A * | 6/1998 | Stumm ................... 709/231 |
| 5,771,291 A | 6/1998 | Newton et al. |
| 5,778,176 A | 7/1998 | Geith et al. |
| 5,829,001 A * | 10/1998 | Li et al. ................ 707/10 |
| 5,829,023 A * | 10/1998 | Bishop .................. 711/118 |
| 5,832,503 A * | 11/1998 | Malik et al. .......... 707/104 |
| 5,841,970 A | 11/1998 | Tabuki |
| 5,842,216 A | 11/1998 | Anderson et al. |
| 5,845,077 A | 12/1998 | Fawcett |
| 5,848,028 A * | 12/1998 | Burklin ................. 368/46 |
| 5,848,244 A * | 12/1998 | Wilson ................. 709/221 |
| 5,852,722 A * | 12/1998 | Hamilton ............. 709/221 |
| 5,857,206 A * | 1/1999 | Tsutsumitake ....... 707/203 |
| 5,867,714 A * | 2/1999 | Todd et al. ........... 395/712 |
| 5,872,928 A * | 2/1999 | Lewis et al. ......... 709/222 |
| 5,909,581 A * | 6/1999 | Park ...................... 395/712 |
| 6,012,088 A * | 1/2000 | Li et al. ................ 709/219 |
| 6,041,333 A * | 3/2000 | Bretschneider et al. .. 707/203 |
| 6,049,671 A * | 4/2000 | Slivka et al. ......... 395/712 |

* cited by examiner

Primary Examiner—Saleh Najjar
(74) Attorney, Agent, or Firm—Blakely, Sokoloff, Taylor & Zafman, LLP

(57) ABSTRACT

The present invention discloses a initializing and reconfiguring a network interface device connecting a client computer system to an external network. The network interface device is configured for the client system by automated procedures and protocols initiated from a remote server. Software programs within the network interface device provide transparent communication between the client computer system and services available on the external network. Similar software programs and a configuration database within the network interface device provide transparent communication between the client computer system and the remote server.

23 Claims, 15 Drawing Sheets

REMOTE RECONFIGURATION OF A SECURE NETWORK INTERFACE

CROSS REFERENCES TO RELATED APPLICATIONS

The present application is a divisional application of U.S. patent application Ser. No. 08/892,301, now issued as U.S. Pat. No. 6,073,172, filed Jul. 14, 1997 and entitled INITIALIZING AND RECONFIGURING A SECURE NETWORK INTERFACE.

The present application is related to the following U.S. Patents:

U.S. Patent entitled, "SYSTEM AND METHOD OF CONFIGURING A REMOTELY MANAGED SECURE NETWORK INTERFACE", having Pat. No. 6,012,100, and issued on Jan. 4, 2000;

U.S. Patent entitled, "INITIALIZING AND RECONFIGURING A SECURE NETWORK INTERFACE", having Pat. No. 6,073,172, and issued on Jun. 6, 2000;

which are assigned to the assignee of the present invention.

FIELD OF THE INVENTION

The present invention relates generally to the field of computer networks, and more particularly to a method of securely initializing and reconfiguring a network interface device.

BACKGROUND OF THE INVENTION

The Internet is rapidly becoming an important source of information and electronic communication for users of computers in homes and businesses. A major problem associated with the Internet, however, is the difficulty faced by typical computer users in connecting their computers or local area networks to the Internet. A computer user desiring to connect to the Internet must make many critical decisions, such as which communication medium to use, which Internet Service Provider to subscribe to, how to secure their network interface, and which network services to utilize. Business managers in charge of local or wide area networks must also address questions related to the type and configuration of computer networks which are to be connected to the Internet, and other such external networks (referred to as 'internets'). Unlike installing a new telephone system, installing an external network connection requires an understanding of many different, and often confusing, communication protocols, network services, connection media, and computer network practices.

Connecting a computer network to an internet requires a service account and a data communication line to access the various networks that make up the internet. A dedicated Wide Area Network (WAN) connection to an internet is typically provided by a commercial Internet Service Provider (ISP). The ISP acts as the intermediary between the user and the network backbone servers which provide access to the various networks within the internet. Several different data communication lines are available to connect a computer or LAN to the internet. Common data communication lines include analog modems (14.4 Kbaud–56 Kbaud), ISDN (Integrated Services Digital Network), T1 lines, Fractional T1 lines, and several others.

Obtaining an internet connection typically requires the user to order an internet account and address block from an ISP, install the appropriate phone lines for the data communication medium (e.g., ISDN line, analog phone line), install the appropriate network interface device between the data communication port and the computer which will serve as the network gateway computer, and configure the network interface device for operation with the user's LAN and in accordance with the network services provided by the ISP. Thus, the initial configuration of the network interface device must be performed by the computer user or LAN manager himself, and often requires extensive knowledge of network protocols, internet services, and LAN requirements. Initial configuration also often involves the entry of complex configuration parameters and options in a database or storage device by the LAN manager. Similarly, an upgrade or reconfiguration of the network interface device requires the user or LAN manager to obtain the upgrade information and perform the upgrade or reconfiguration operation himself. Because no internet services or data communication systems currently provides a comprehensive and reliable means of automatically configuring or updating a network interface connection to an internet, internet access remains a significant challenge to those who lack the requisite expertise or resources to undertake the task.

It is therefore desirable to provide a system for connecting a computer or client network to the internet with minimal user interaction. It is further desirable to provide a system for automatically upgrading or reconfiguring a network interface connection between a computer or client network and an internet.

SUMMARY OF THE INVENTION

The present invention discloses a method and apparatus for initializing, configuring, and upgrading a network interface between a client computer network and an external network.

According to one aspect of the present invention, a network interface device is provided to connect a client computer network to an external network. The network interface device is provided to the client user in an initially unconfigured state. The network interface device is configured for the client system by automated procedures and protocols initiated from a remote server. The remote server provides and maintains the client information in a secure database. The use of a secure database and automated procedures minimizes the amount of input required from the user. The network interface device contains application program interfaces which facilitate communication between the client computer system and services available on the external network. The network interface device also contains a configuration database which stores data and parameters related to the configuration of the network interface device. Through the use of the configuration database and the resident application program interfaces, the remote server is able to automatically upgrade or reconfigure the network interface device without user intervention.

Other features of the present invention will be apparent from the accompanying drawings and from the detailed description which follows.

BRIEF DESCRIPTION OF THE DRAWINGS

The present invention is illustrated by way of example, and not by way of limitation, in the figures of the accompanying drawings and in which like reference numerals indicate similar elements and in which.

DETAILED DESCRIPTION

A system for initializing, configuring, and upgrading a network interface device coupling a client Local Area Network (LAN) to a Wide Area Network (WAN) is described. In the following description, for purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In one embodiment, the steps of the present invention are embodied in machine-executable instructions. The instructions can be used to cause a general-purpose or special-purpose processor which is programmed with the instructions to perform the steps of the present invention. Alternatively, the steps of the present invention might be performed by specific hardware components that contain hardwired logic for performing the steps, or by any combination of programmed computer components and custom hardware components.

Figure 1:
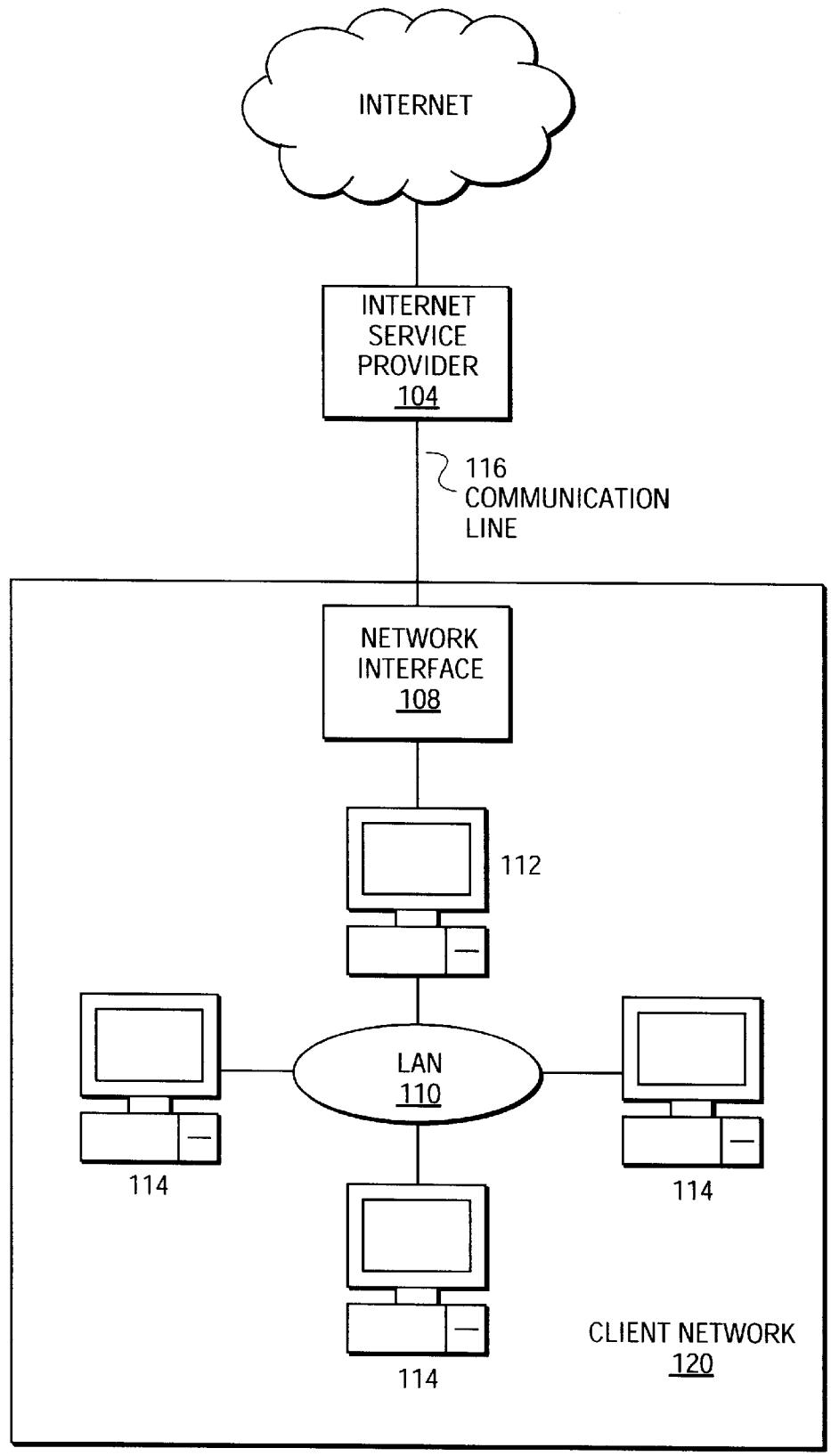
FIG. 1 illustrates a prior art interface between a client network and an internet.

Present methods of interfacing a client LAN to an external network involve installing special data communication lines and network interface devices, and configuring these devices at the client site. FIG. 1 illustrates a typical prior art connection between a client network and an external network. Client network 120 includes a local area network (LAN) 110 containing several network client computers 114. LAN 110 also contains a gateway computer 112 which connects LAN 110 to an external network, such as an internet. LAN 110 may be a network consisting of a number of computers connected in an Ethernet network, a token ring network, an FDDI network, or any similar type of network arrangement. LAN 110 could also consist simply of one computer, such as computer 112, for which external network access is required. LAN 110 interfaces to outside networks through a network interface device 108 connected to gateway computer 112. In other network environments, LAN 110 may interface directly with network interface 108 without passing through a gateway computer 112. In typical home or office situations, network interface 108 can be a modem, an ISDN (Integrated Services Digital Network) interface box, or the like, and can be an interface card within gateway computer 112, or a standalone device which is kept separate from LAN 110 and gateway computer 112, such as in a separate phone closet or other isolated environment.

Network interface 108 provides the connection to an internet over communication line 116. Current internet service for client networks is typically provided by a commercial Internet Service Provider, such as ISP 104. ISP 104 provides the necessary routers and gateway devices for connection to the internet from a client network, and provides various protocol and packet switching functions. Thus, LAN 110 in client network 120, connects to an internet via communication line 116 through an ISP.

In prior art network connection environments such as that illustrated in FIG. 1, ISP 104 simply provides the addresses and logical interface between client network 120 and the internet. The client user is required to install, configure, and maintain the network interface 108 and the interface to the telephone company 106. This requires that the LAN manager for the client network 120 have knowledge of the client LAN environment, as well as required protocol and interface information and various configuration parameters. As the types of network connectivity and the number of services available through the Internet increase, the task of installing, configuring, and maintaining a network interface to the Internet, and other such external networks, becomes more complicated. This increase in network interface complexity results in an increased possibility of improper network access which may cause unreliable service or insecure network connections. Thus, a distinct disadvantage associated with prior art network access scenarios is that the LAN manager for a client network must personally configure and maintain increasingly complex parameters related to both the LAN network protocols and the various network services.

In one embodiment of the present invention, the various physical network interface devices, security functions, and service interfaces are replaced by a single integrated network interface device, hereinafter referred to as a 'gateway interface device'. This integrated gateway interface device provides a single point of connectivity for various different types of data communication lines, such as Ethernet and ISDN, and contains a configuration database for the storage of parameters associated with the operation of the network interface. The gateway interface device also contains application program interfaces (API's) for transparent communication between the client LAN and various internet services. The gateway interface device further provides connectivity to a remote server process which provides remote initialization, configuration, and upgrades of the gateway interface device without necessitating extensive user interaction.

Figure 2:
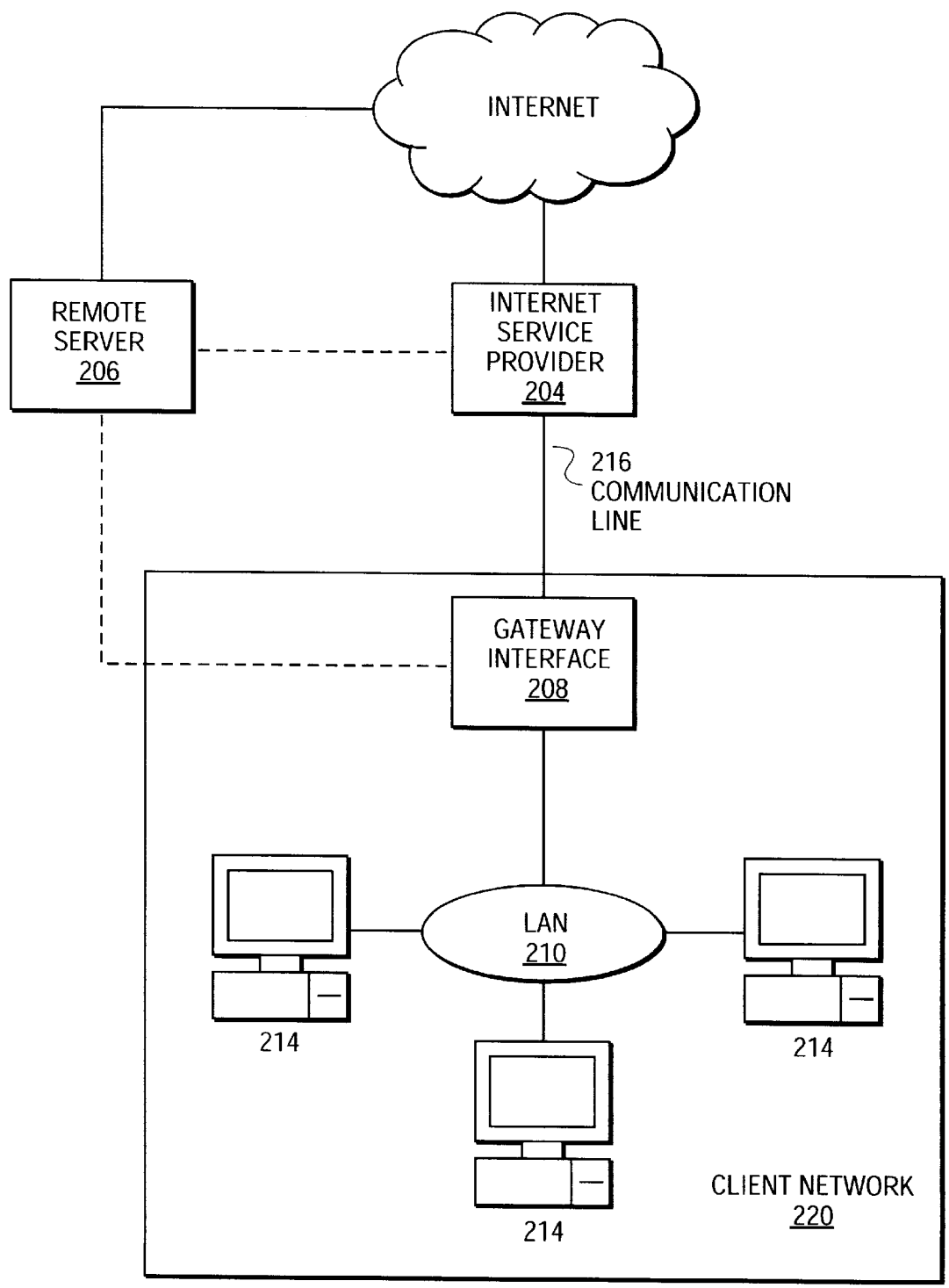
FIG. 2 illustrates the interface between a client network and an internet according to one embodiment of the present invention.

FIG. 2 illustrates an improved internet network access of the present invention utilizing the gateway interface device.

Like the client network 120 of FIG. 1, client network 220 typically consists of a LAN environment 210 in which several personal or mini-computers are connected through network lines or hubs in a network arrangement. In the present invention, the simple network interface 108, of FIG. 1, which is typically a passive device configurable only from client network 120 through gateway computer 112, is replaced by a gateway interface device 208. Gateway interface device 208 provides the physical and logical connection between LAN 210 and an external network, such as an internet. Data communication ports provided by gateway interface device 208 may include interfaces for analog modems, Ethernet, ISDN, T1 connections, and the like. Gateway interface device 208, also provides an interface to the remote servers and services provided in the present invention. This second means of access allows a secondary service provider to remotely configure, upgrade, and maintain diagnostics related to the network interface. It also facilitates the downloading of configuration parameters, a task which was traditionally left to the client LAN manager. Gateway interface device 208 also provides an efficient means to implement network security such as firewall functions, as well as other router and server functions.

The remote server 206 represents central facility for providing convenient and efficient configuration and maintenance of the gateway interface device. In one embodiment of the present invention, the remote server 206 (hereinafter referred to as the "remote management server") is connected to ISP 204 and maintains a dynamic dialog with ISP 204 to configure and maintain gateway interface device 208 in client network 220. Remote management server 206 interacts with gateway interface device 208 to provide configuration information and upgrade parameters required by the gateway interface device 208. In this manner, remote management server 206 basically serves as a repository for information required by the gateway interface device 208. Such information may include configuration information related to LAN 210, internet address blocks, internet domain names, and data related to the physical and logical interfaces between the client network 220 and ISP 204.

Gateway interface device 208 contains a configuration manager which stores the configuration information transmitted from the remote management server 206. Gateway interface device 208 also contains service adapters which communicate with network services resident in the gateway interface device 208. The service managers are application programming interfaces that provide the required command and data translation for the various services available.

Remote management server 206 and gateway interface device 208 contain security information such as passwords and encryption keys that are used to establish a trust relation sufficient to ensure secure remote configuration and upgrade of gateway interface device 208. By providing a configuration management function within remote management server 206 which is registered with an ISP 204, it is possible to download configuration and upgrade information and parameters to gateway interface device 208 at the time the gateway interface is first installed between the client network 220 and the telephone client 204. This eliminates the requirement that the network administrator program the network interface device with such configuration and initialization information. This system thus greatly reduces the amount of work required to connect client network 220 to an internet.

Gateway Interface Device Hardware

Figure 3:
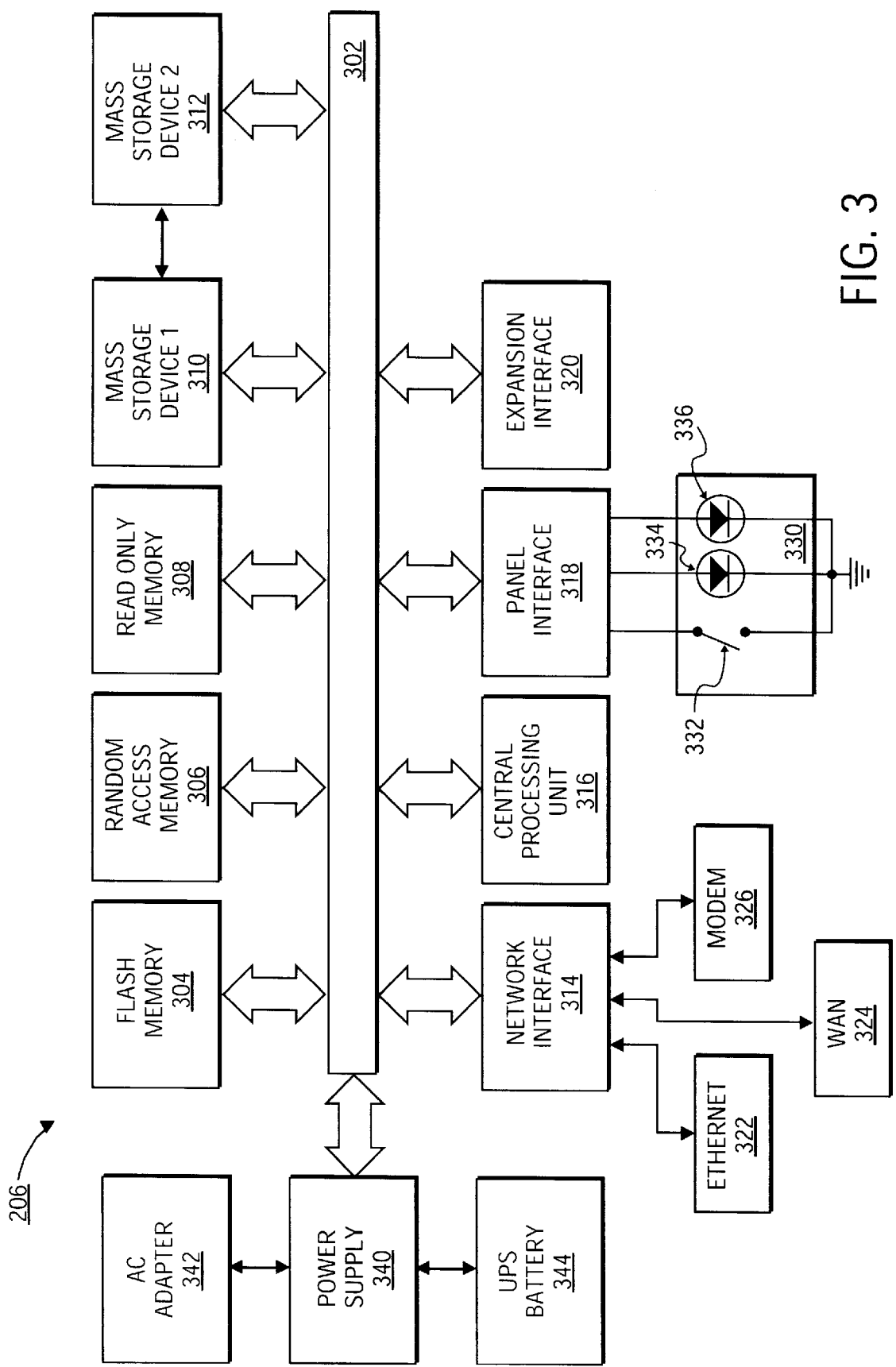
FIG. 3 is a block diagram illustration of hardware components of the Gateway Interface Device according to one aspect of the present invention.

FIG. 3 is a block diagram illustrating representative hardware components within gateway interface device 208 of FIG. 2. Gateway interface device 208 includes central processing unit 316 coupled through a bus 302 to random access memory (RAM) 306, read-only memory (ROM) 308 and mass storage device 310. In one embodiment of the present invention, two mass storage devices 310 and 312 are used to provide redundant storage. Mass storage devices 310 and 312 can be any type of memory device which provides persistent storage of large amounts of data such as hard disk drives, tape drives, or memory cards. In one embodiment of the present invention, mass storage devices 310 and 312 are removable devices which can be moved from gateway interface device 208 to another similar gateway interface device, or removed for replacement by other like mass storage devices with either updated or different data or programs. Mass storage devices 310 and 312 may be installed and configured in a mirrored arrangement, such that identical data is written simultaneously to both drives. This allows a redundant backup functionality such that if one mass storage device fails, the other mass storage device can be automatically and quickly substituted since it contains the same data contained in the first mass storage device. Gateway interface device 208 also contains non-volatile memory in the form of flash memory 304. Flash memory 304 stores critical system parameters and may be upgraded remotely from a remote server such as remote management server 206.

Also coupled to bus 302 is an expansion interface 320. Expansion interface 320 provides physical and logical lines which allow for the installation of industry standard expansion cards to expand the functionality of the gateway interface device 208. Such expansion functions could include additional memory capacity or an alternate network interface means. Gateway interface device 208 interfaces to external networks through a network interface port 314. In one embodiment of the present invention, network interface 314 includes four separate network interface connections and standards. Network interface 314 provides access to modem port 326, WAN interface 324, and Ethernet port 322. In one embodiment of the present invention, two Ethernet ports are provided by network interface 314.

Panel interface 318 provides the main physical interface between the user and gateway interface device 208. In one embodiment of the present invention, panel interface 318 is coupled to a front panel display and control system 330. Display and control system 330 contains two LEDs (light emitting diodes) 334 and 336, as well as push button switch 332. Push button switch 332 serves as an on/off switch as well as a high-level reset switch. If the gateway interface device is powered up and switch 332 is pressed for less than five seconds on, it executes a diagnostic process. If the gateway device is powered up and switch 332 is pressed for more than five seconds, it restarts the gateway interface device. Thus switch 332 allows a user to activate certain diagnostic routines and it provides a reset function in case of a hardware failure of the gateway interface device 208. LEDs 334 and 336 provide an indication of particular operational functions of the gateway interface device 208. Functions that are monitored by LEDs 334 and 336 may include the condition of the client LAN 210, the condition of the physical or logical connections between the client LAN 210 and the telephone company switch box, as well as the internal operation of the gateway interface device 208. The uncomplicated front panel display and control system 330 promotes the ease of use pursued by the present invention. The single push-button switch 332 provides a straightforward means of interaction with the gateway interface device, and dual LEDs provide a simple notification to the user in the event of a failure related to the primary virtual user interface.

System power to the gateway interface device 208 is supplied through power supply 340. Power supply 340 provides the varying voltage levels such (e.g., 12 VDC, 5 VDC, and 3.3 VDC) that may be required by the different devices within the gateway interface device 208. Connected to power supply 340 is an uninterruptable power supply (UPS) battery 344. In one embodiment of the present invention, UPS battery 344 is a small compact unit which provides a charge sufficient only to keep gateway interface device 208 powered up for a smooth shutdown in the event of a hardware or network problem. A smooth shutdown procedure allows time to write critical data to the disks, and power down each of the devices within gateway interface device 208 in a non-destructive manner. Power supply 340 may be configured such that in the event of a hardware or network failure, software controlling operation of the gateway interface device 208 is executed to turn the machine off. In a similar manner, an on/off or reset switch, such as switch 332, may be similarly configured to request software to turn power down the gateway interface device. In one embodiment of the present invention, the user interface to the gateway interface device 208 is limited to front panel interface 318 and the front panel control and indication block 330. Gateway interface device 208 may be packaged in any number of standard package formats. In one embodiment of the present invention, the gateway interface device is packaged in a 19-inch form factor box. This facilitates the installation of the gateway interface device in a standard rack mount such as those commonly used in telephone switching closets, thus allowing the gateway interface device to be mounted in such a closet or other hidden location for unattended operation.

System Software

Figure 4:
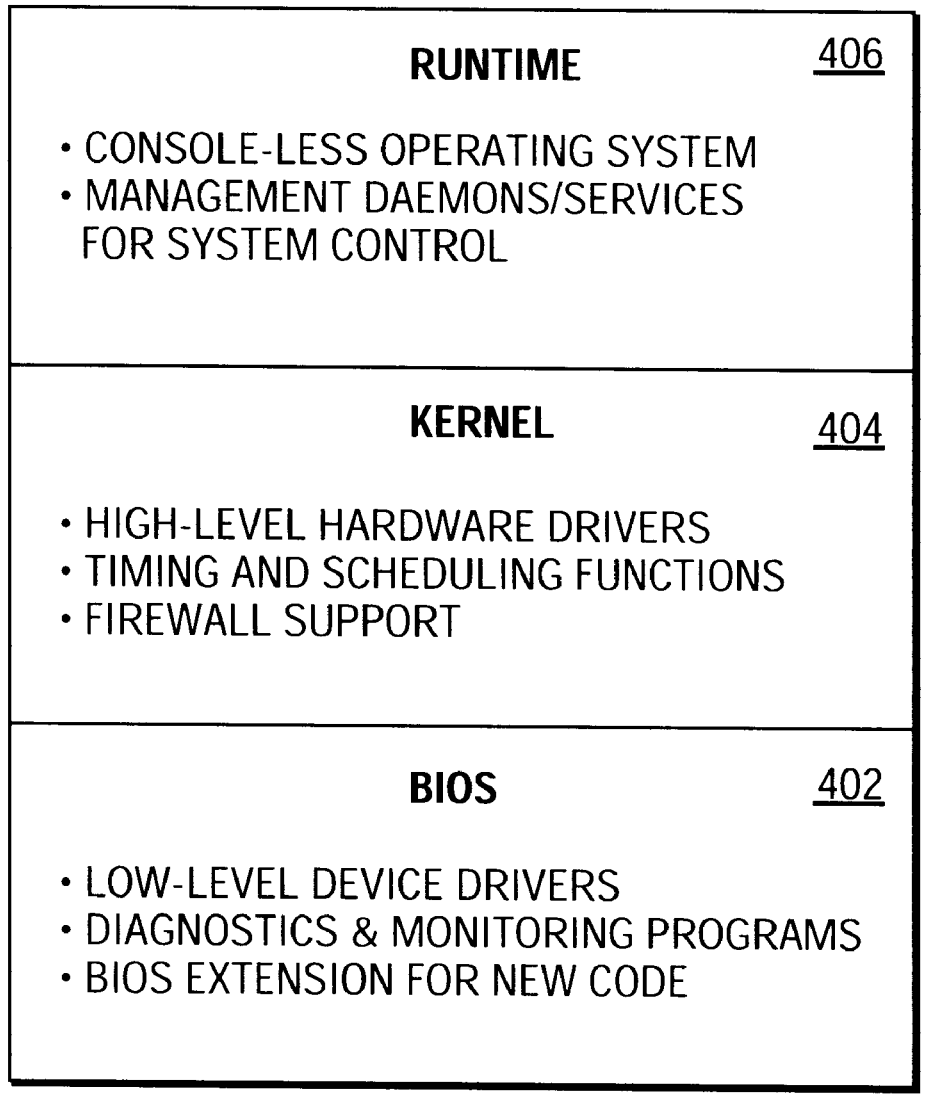
FIG. 4 illustrates the basic components of the Gateway Interface system software.

FIG. 4 is a block diagram illustrating the components within the system software contained in and executed by gateway interface device 208. The gateway interface device system software 400 consists of three main portions. These are the BIOS (basic input/output system) section 402, kernel 404, and run-time section 406. The three components comprising the system software 400 may be stored and executed from read-only memory 308, RAM 306 or any combination of RAM, ROM, and disk within the gateway interface device 208.

BIOS section 402 contains the program code necessary to interface with the hardware within gateway interface device 208, these are typically low-level device drivers. BIOS 402 also contains diagnostic and monitor code as well as a BIOS extension for factoring in new code. Kernel 404 comprises the second layer of system software and contains high-level drivers for the hardware devices within gateway interface device 208, as well as drivers for system services that are required to operate the gateway interface device 208. Kernel 404 also contains task schedulers and an interrupt controller.

The third layer of system software 400 is the run-time section 406. Run-time section 406 contains the management daemons and services required for system control. In one embodiment of the present invention, run-time section 406 is implemented as a console-less version of a standard operating system. The implementation of a console-less operating system runtime allows the system software to operate without user intervention, thus facilitating the remote access capabilities of the present invention. This system also provides an interface to existing network services which are wrapped in a management layer to allow them to be plugged in or interfaced to the system without requiring user intervention or configuration. Such services that may interface with the system software include web service, electronic mail service, and other similar computer programs and application programs.

Runtime Layer

Figure 5:
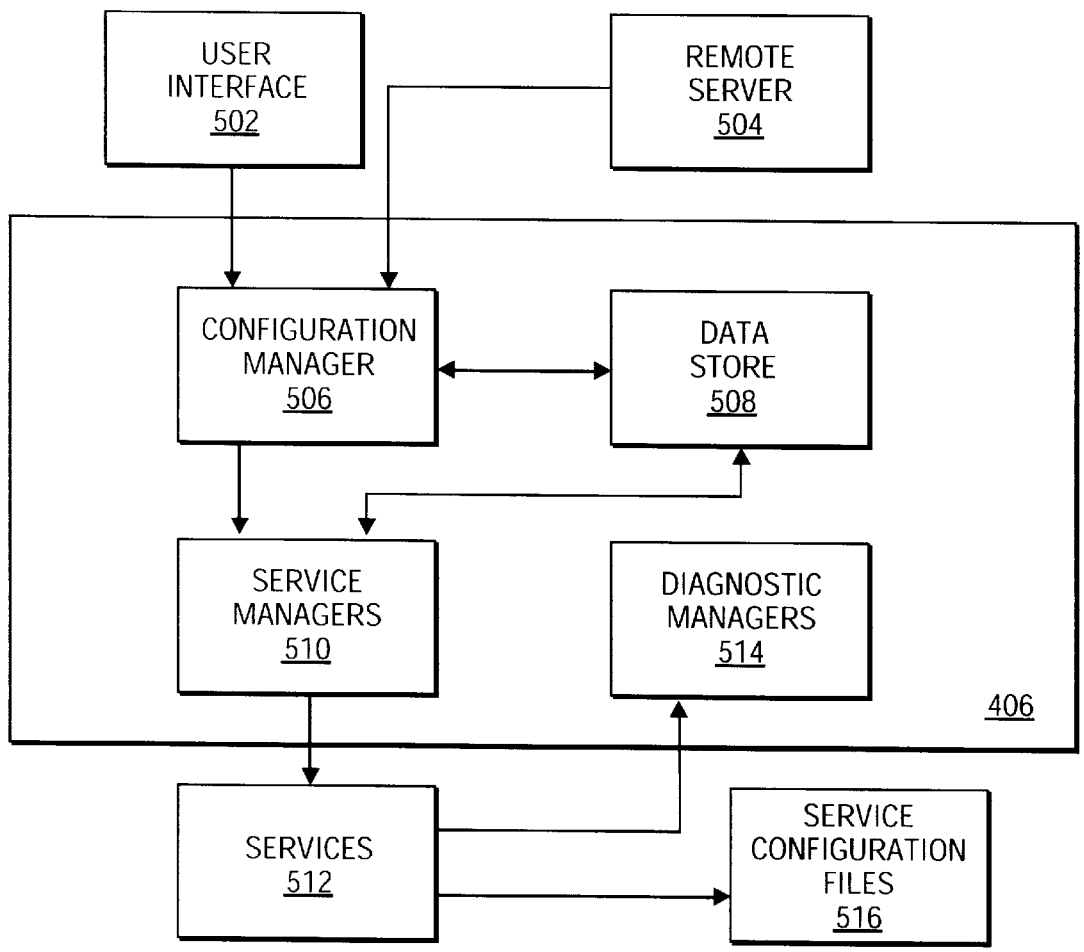
FIG. 5 is a functional block diagram of the runtime component of the system software.

FIG. 5 illustrates the functional relationships among the various components of the software associated with the runtime layer 406 of system software 400. The runtime layer 406 contains management programs for controlling the gateway interface device and provides the program interface between a user interface 502 operating on a computer coupled to client LAN 210, and network services available on an external network. FIG. 5 illustrates the runtime layer 406 as a functional program layer between the user interface 502 and network services 512. One example of a network service which could be represented by network service 512 is the popular Internet Web service, HTTP (hypertext transport protocol). The HTTP service contains a daemon process, HTTPD, which contains text configuration files which control access to, and operation of the web service. The HTTP service allows certain user actions such as editing of text files or changing a process. It should be understood that a number of different services or types of services may be controlled by runtime layer 406, and that service 512 illustrates only one such service.

Runtime layer 406 contains a configuration manager 506 which is an API operating through a remote procedure call (RPC) protocol to communicate commands between the user interface 502 and network services 512. Configuration manager 506 is connected to data store 508 which serves as a database for configuration and system data. Configuration manager 506 communicates to services 512 through services managers 510. One service manager is provided within runtime 406 for each service available to user interface 502. The service managers provide a consistent interface to the various network services. The service managers essentially 'wrap' a software management layer around network services to adapt the service for the gateway interface device. Each service manager allows a user, through a user interface, to perform certain service functions, such as bring down the service, reconfigure the service, and bring the service back up.

In one embodiment of the present invention, the configuration manager is a server process that dynamically loads within its own address space service managers which are implemented as dynamic libraries. The service managers 510 implement a particular API so that there is a consistent interface with service managers from the user interface 502. The configuration manager 506 provides an external API which facilitates communication with other programs on the gateway interface device 208, such as user interface 502. All of the network services provided by the gateway interface device 208 are represented by data structures in data store 508 which interface to the services 512 through the configuration manager 506. Through the implementation of the configuration manager and service managers as API's, a consistent communication interface to network services is provided. Thus, turning on a particular service simply requires accessing configuration manager 506 and setting a value in a particular data location. For example, to enable web publishing, the user could select an enabling option button in the user interface 502. User interface 502 then sets the appropriate parameter in the data store 508 to "on". This, in turn, enables the gateway interface device policy for web publishing. As parameters in the data store are changed in this manner, the service managers are notified of these changes in order to maintain currency with available services. Each of the services maintains service configuration files 516 which store configuration information related to the services.

Figure 6:
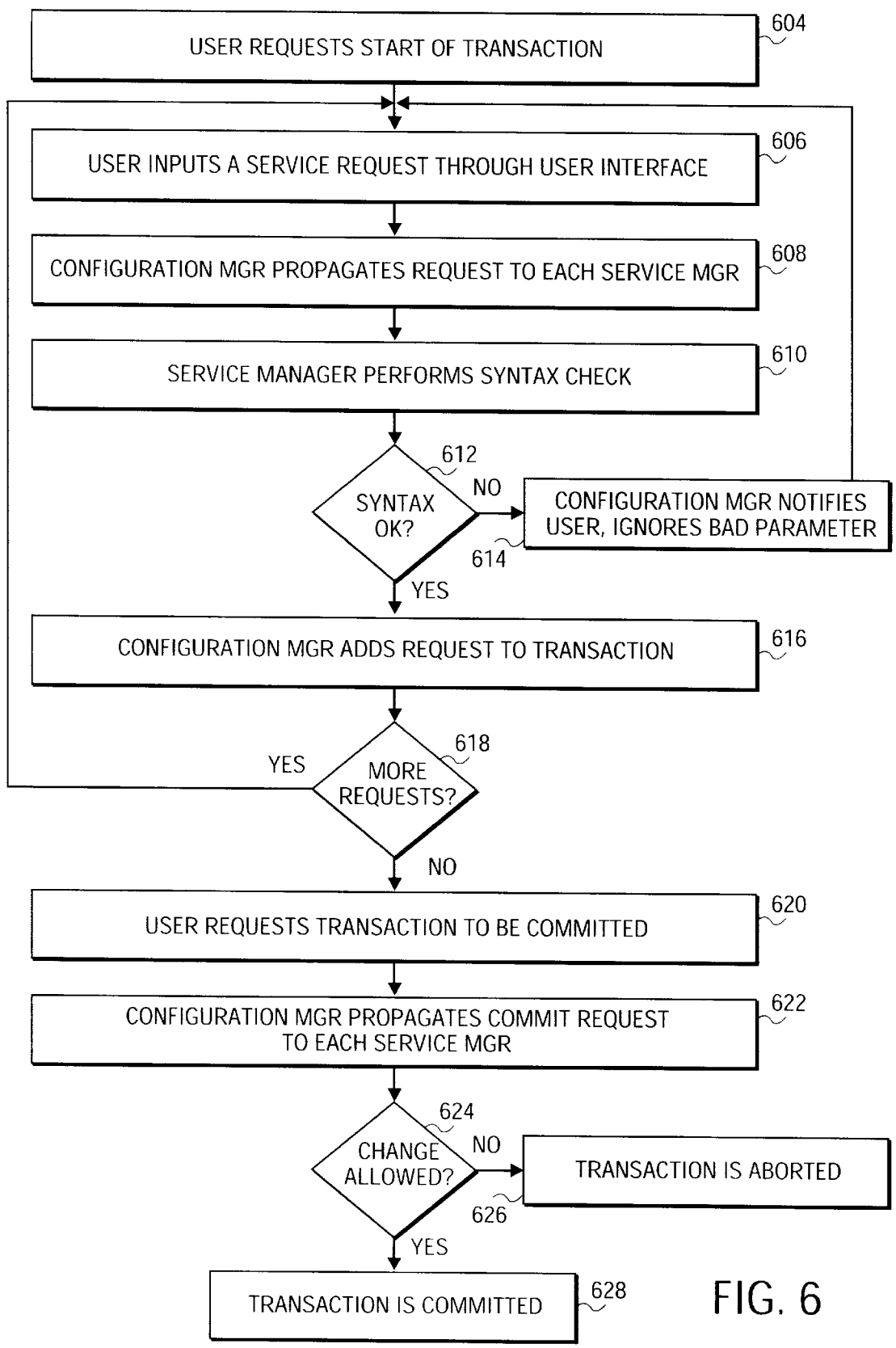
FIG. 6 is a flowchart illustrating the process of controlling a service using the runtime component illustrated in FIG. 5.

FIG. 6 is a flow chart which illustrates a typical process associated with using or manipulating a service through user interface 502. In step 604 the user requests the start of a transaction involving a network service. A typical transaction may involve one or more service requests. The user then makes a service request through user interface 502 in step 606. The request could be any one of a number of service operations, such as a request to bring the service up or down, reconfigure the service, or any other such operation. The request is input from the user interface 502 to configuration manager 506. In step 608, the configuration manager 506 propagates the request to each service manager which is available within the runtime layer 406. If necessary, the service manager 510 performs any translation or adaptation of the request to a corresponding command recognized by the service. The service manager 510 also checks the request and evaluates the proposed change in the data store 508. Service managers are thus given the opportunity to veto requests or changes to the data store 508 that may potentially crash the system.

The service managers are provided a two level check. One level is a simple syntax check in which a service manager checks the syntax of the request or parameter. If the request contains an improper parameter, the service manager may reject the parameter but accept the request. In step 610, the service manager performs a syntax check. If, in step 612, it is determined that the syntax of the request is not acceptable, the configuration manager notifies the user and ignores the parameter which did not correspond to the correct syntax, step 614. The process then proceeds again from step 606 in which the user is given another opportunity to enter a syntactically correct service request. If it is determined, in step 612, that the syntax of the service request is proper, the configuration manager adds the request to the transaction, step 616.

In step 618, the configuration manager checks whether there are further requests to be included in the transaction. If further requests are to be processed, the process proceeds from step 606 and the user inputs a further service request through the user interface. If, in step 618, no further requests are determined to be included, the user requests the transaction to be committed, step 620. The configuration manager then propagates the commit request to each applicable service manager, step 622.

The second level check provided to service managers involves a veto of the request as a whole. Such a veto may occur if the required changes to the data store invoked by the request may cause a system failure. If the change is not allowed by the service manager, step 624, changes are not written to data store 508, and the transaction is aborted, step 626. In this case an error message may be sent to the user interface 502 to alert the user of the failure of the transaction. If however, in step 624, it is determined that the change is allowed by the service manager, the values are written to data store 508 and the transaction is committed, step 628. The result of the operation may then be propagated back to user interface 502 through the service manager and configuration manager 506.

The service managers 510 may also be configured to periodically check the state of their respective services 512. The service manager polls the service daemon to check whether the service is still running. If the service daemon is not up, the service manager can attempt to bring it up or move into a failed state if it cannot bring up the service. This failed state is observed by a diagnostic process managed by diagnostic managers 514, and reflected in the user interface. The frequency of the polling operation may be set in the configuration manager at the time a service manager is loaded into the system.

Remote server 504 contains the remote management server process. The remote management server can connect to the configuration manager 506 in order to perform monitoring and reconfiguration. Remote management server 504 stores configuration information provided by the user which is related to the user's local area network environment, service requirements, domain names, and so on. The remote management server also provides a mechanism whereby new services may be added to the system and corresponding new service managers may be added to the runtime layer. A service request which is initiated by the remote management server would propagate through the runtime layer in a manner similar to a user interface initiated request, as illustrated in FIG. 6.

Figure 7:
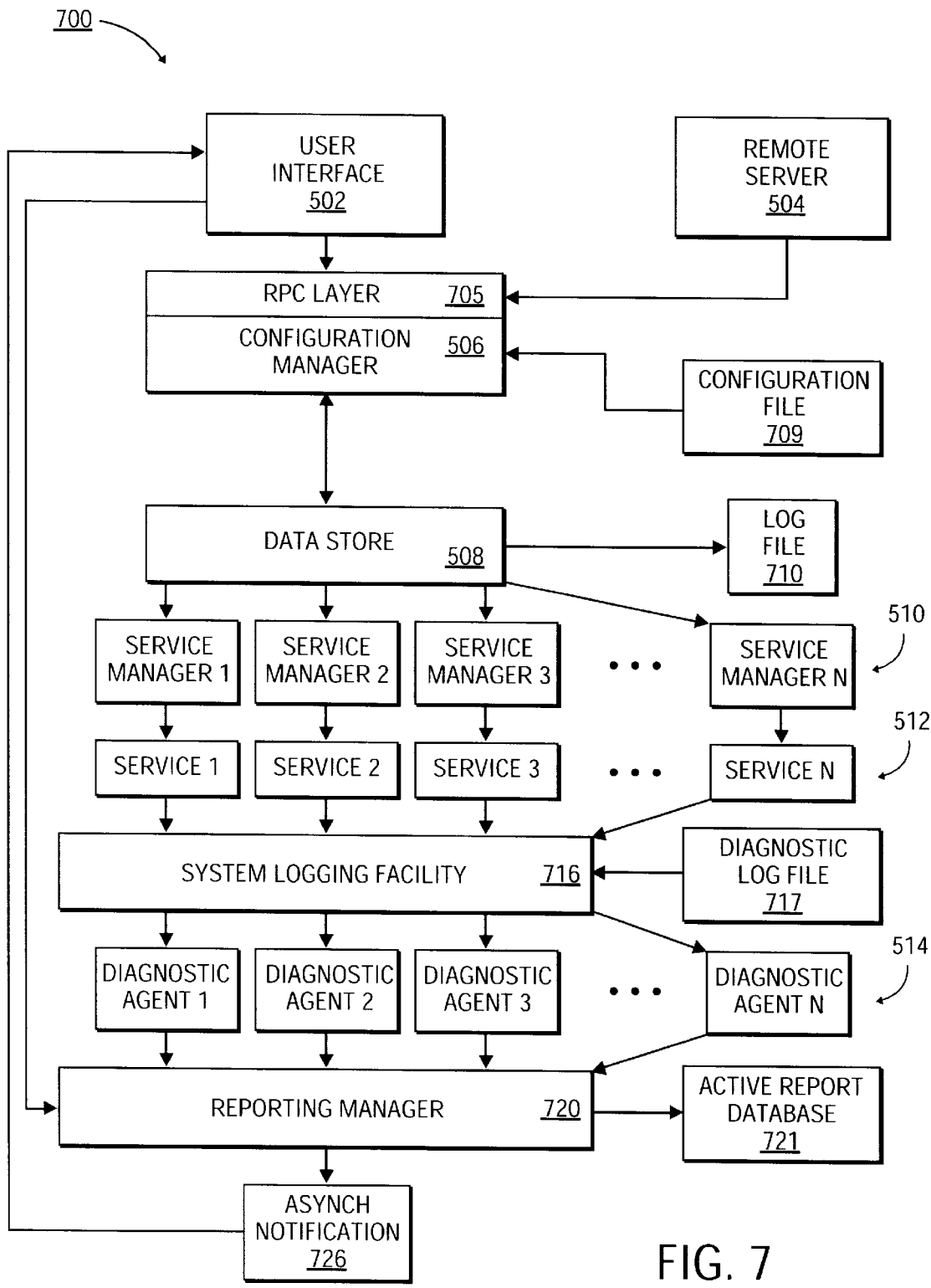
FIG. 7 is a functional block diagram illustrating the software components of the Gateway Interface system.

FIG. 7 is an expanded and more detailed illustration of the software components which comprise the gateway interface device system software. In one embodiment of the present invention, configuration manager 506 is a server process with an RPC interface layer 705. Configuration manager 506 dynamically loads service manager libraries upon startup. The service manager libraries that are to be loaded are provided in configuration file 709 which stores certain parameters and files for writing to configuration manager 506 upon startup. In an alternate embodiment of the present invention, the service managers are implemented in architecture independent program modules (e.g., Java classes), which are loaded on demand by a configuration manager. In the alternate embodiment of the present invention, the configuration manager itself may also be implemented in an architecture independent program module.

Several different service managers may be available. A minimal set of service managers for a typical internet access scenario may include a domain name service (DNS) manager, HTTP manager, electronic mail manager, IP manager, ISDN manager, and system manager, among others. The implementation of service managers allows the use of unmodified services. The service managers provide a consistent interface and minimize the necessary changes to a service to integrate the service in the system.

In one embodiment of the present invention a user manager is also provided. Users are represented as entries in the data store, as opposed to being represented in a password file, as in other standard network operating systems. Also provided is a network configuration service manager to manage the initial configuration process and tasks such as entering a registration key and other initial configuration operations.

Logically connected to the configuration manager 506 is data store 508. Data store 508 primarily stores parameters related to the services. In one embodiment of the present invention, the data store resides in RAM, and a persistent form is also stored on secondary memory, such as a hard disk. Changes to the data store are written to log file 710. Log file 710 maintains a list of completed transactions to disk, and allows a mechanism whereby the configuration manager can roll back to a known good state in the event of a system crash.

As described in relation to FIG. 5, configuration manager 506 communicates to various network services through service managers API's which provide a common interface environment for the user interface 502. In FIG. 7, several services 512, and their corresponding service managers 510 are illustrated. The various services 512 provided by the external network report errors and diagnostic information through a socket level protocol to a system logging facility 716. System logging facility 716 serves as a general repository for diagnostic messages; it also distributes these messages to specific files or functions based upon information inside the messages. According to one embodiment of the present invention, the system logging facility is configured to send messages in a protocol format which is designed to review the diagnostic messages and automatically transmit the message to appropriate functions (agents). These agents then cause the system to take corrective action without user intervention, or alternatively notify the user that a problem or diagnostic condition exists.

A set of diagnostic agents 718 are logically coupled to system logging facility 716. In one embodiment of the present invention, each diagnostic agent is programmed to respond to particular problems or error message formats, thus increasing the efficiency with which errors or diagnostic conditions may be handled in relation to particular services. As system logging facility 716 receives messages through network sockets from the different services 714, system logging facility 716 routes particular messages to specified destinations as the messages demand. The messages are also transmitted unformatted to appropriate diagnostic agents 718. The diagnostic agents examine the messages as they are received and continuously determine whether or not the system is performing properly.

System logging facility 716 writes its operations to a diagnostic log file 717 through a diagnostic logging agent. This agent collects all of the messages into diagnostic log file 717. The diagnostic log file is used in the case where the system has failed in a manner that cannot be readily remedied. In this case technical support personnel can read the raw log data from diagnostic log file 717 to determine the problem. Thus, the log file provides an audit trail for technicians to use. If a diagnostic agent encounters a message indicating an error or other exceptional occurrence which requires reporting to the user interface 702, a message is sent to reporting manager 720. Reporting manager 720 is a repository for reports that are generated by the diagnostic agents. The reporting manager 720 provides a query capability for the reports that it stores and allows an ability to delete or time-out the reports, among other such functions. A report consists of a message code, any related arguments to that message, and time-stamping and expiration information. The message code and related arguments are used by the user interface to localize the report. The report also contains a mechanism for resolving the report, for instance, a uniform resource locator (URL) may be included. The user interface requests report information from the reporting manager and locally presents these reports to the user.

Reporting manager 720 maintains an active report database 721 which serves as a persistent store for reports that are active. If necessary, user interface 502 can extract reports directly from reporting manager 720. In addition to active report database 721, reporting manager 720 sends the message to an asynchronous notification server 726. Asynchronous notification server 726 communicates the existence of a problem to the user through a display message on user interface 502. In one embodiment of the present invention, asynchronous notification server 726 displays a dialog box on the display screen of the client computer to which the gateway interface device is connected, and alerts the user of a problem on the gateway. Part of the message may be an icon that enables a web browser which accesses the URL contained within the error message. The system monitor is also configured to periodically ping the gateway interface device to monitor proper operation. If the gateway interface device does not respond, the system monitor may cause the display of a message alerting the user that the gateway is not responding with instructions on how to proceed.

Thus, the process of performing operation monitoring, error diagnosis, and error reporting is accomplished through a combination of system logging facility 716, diagnostic agents 718 that communicate with system logging facility 716, reporting manager 720, and asynchronous notification 726.

Remote System Management

The combination of a security framework, configuration manager API, service managers and diagnostic reporting capabilities within the runtime layer 406 of system software 400 creates a generic framework for interfacing with various network services through a single user interface. It also allows remote management of the gateway interface device, and provides an efficient mechanism for initially configuring, upgrading, or reconfiguring the gateway interface device.

Discussion is now provided for three proprietary protocols which control communication between the remote management server remote server process and the gateway interface device. These protocols involve operation of the configuration manager 506 and cover the initialization, upgrade, and reconfiguration of the gateway interface device within the client network LAN environment.

Initialization

The initialization protocol utilized by the gateway interface device provides a method by which the gateway interface device and the gateway computer of the client LAN are configured for internet access from a remote server with minimal user interaction. In one embodiment of the present invention, the remote server (remote management server) communicates with the gateway interface device through the external network medium, but is viewed as a virtual device in terms of configuration and remote management from the point of view of the client network. The initialization protocol is used when the client network orders internet access from an Internet Service Provider and receives the gateway interface device.

Figure 9A:
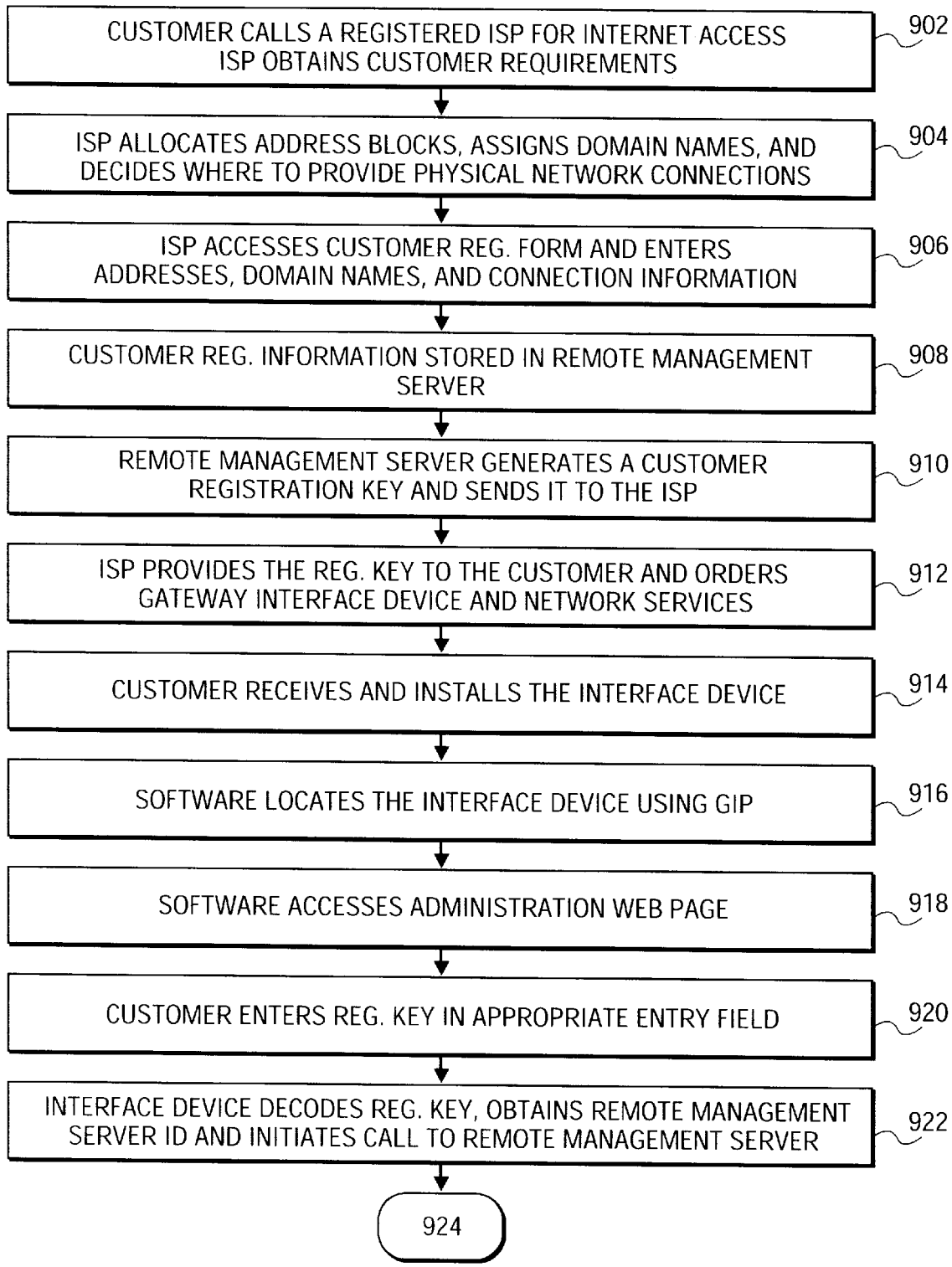
FIGS. 9A and 9B are a flow diagram illustrating the procedure of initializing a Gateway Interface Device according to one aspect of the present invention.
Figure 9B:
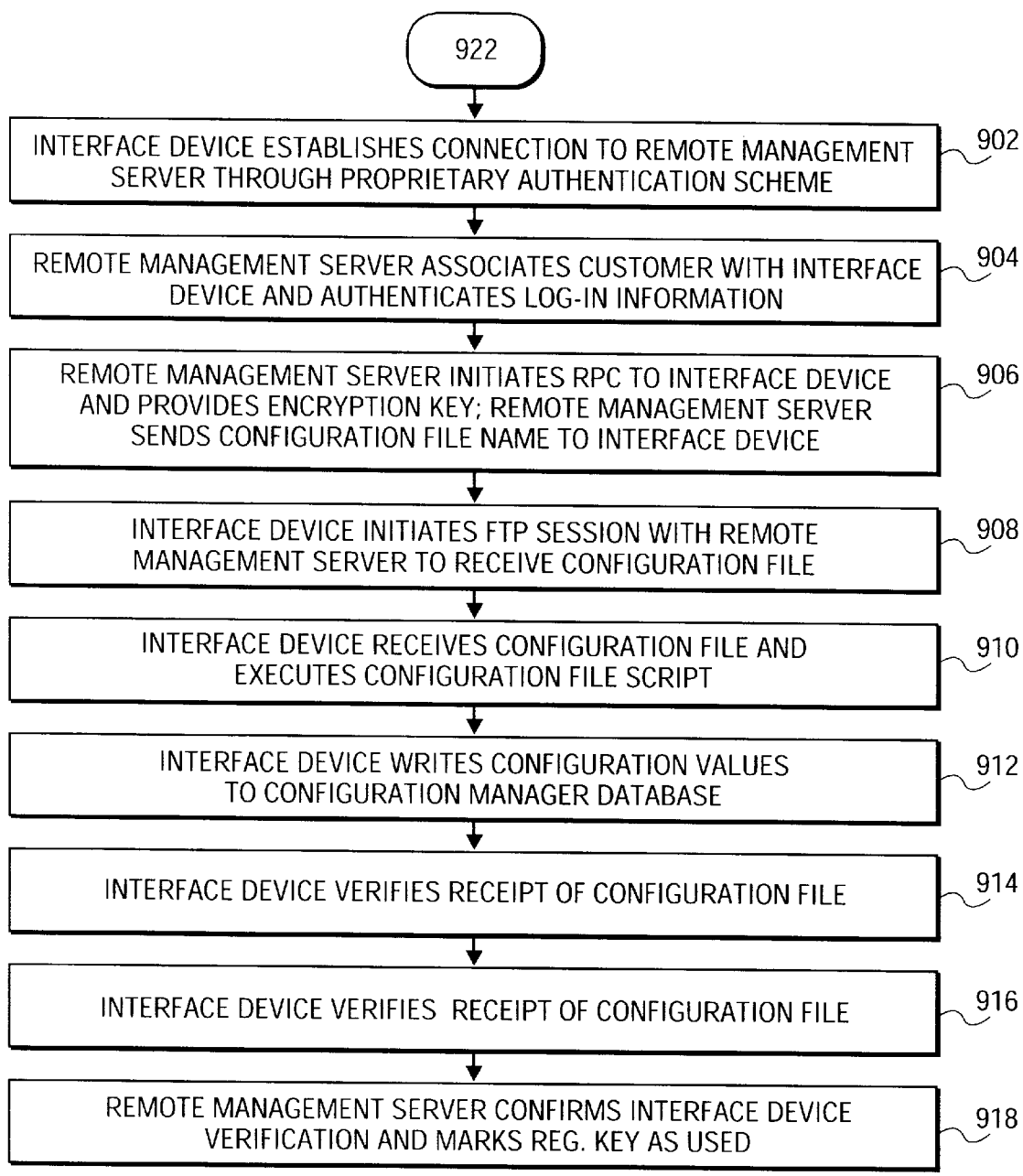

In one embodiment of the present invention, it is assumed that there is a TCP/IP (Transmission Control Protocol/Internet Protocol) based network client on the client LAN which has physical connectivity over the LAN to the gateway interface device. It is further assumed that the gateway computer is a node within a TCP/IP network. FIGS. 9A and 9B provide a flow diagram of the process of a client network installing and configuring a gateway interface device using the initialization protocol provided by the system software.

Referring to FIG. 9A, the initialization process begins in step 902 when the customer calls an ISP to obtain an internet account. In one embodiment of the present invention, the ISP is appropriately registered to provide the gateway interface device and accompanying services. The ISP obtains customer requirements such as the client LAN environment, network services which the customer requires, the desired data communication medium, and the network interface connections that the customer requires. The ISP then allocates IP address blocks, assigns internet domain names and decides where to provide the physical network connections, step 904. For example, if the customer desires an ISDN connection to the internet, the ISP would decide where to hook up the ISDN line, and orders the ISDN service for the customer. The ISP provides the remote management server with the configuration information for the user. According to one embodiment of the present invention, this is achieved through a web-based user interface. A customer registration web site provides a customer registration form which is used by the ISP. The ISP enters customer network addresses, domain names and network connection information in the registration form, step 906. This customer registration information is then stored in the remote management server after having been entered into the customer registration form, step 908. The remote management server acts as a storage facility for this customer information. After the customer registration information is stored, the remote management server generates a customer registration key and sends the registration key to the ISP, step 910. The registration key serves as the principal identification and security mechanism for initial installation of the gateway interface device in the client LAN.

Figure 8:
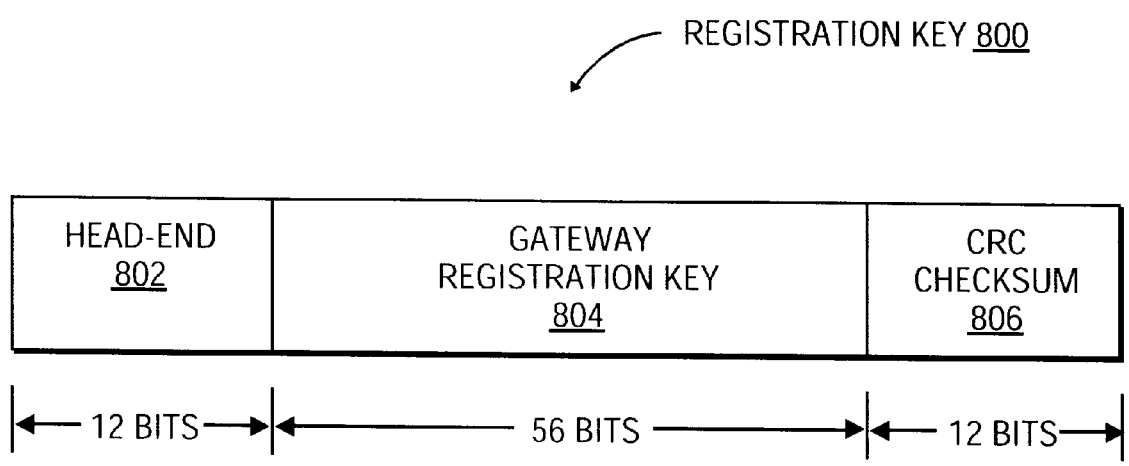
FIG. 8 illustrates a registration key to encode user registration information according to one embodiment of the present invention.

FIG. 8 illustrates the contents and format of the registration key. In one embodiment of the present invention, the registration key is 80 bits long and contains three fields. The first field, 802, is the remote management server key which is 12 bits long and uniquely identifies the remote management server which generated the registration key. The second field, 804, is the gateway registration key field which is 56 bits long and uniquely identifies the gateway interface device to the remote management server. The third field, 806, is a cyclic redundancy check (CRC) field which is 12 bits long and provides a CRC on two other fields to allow self checking. The gateway registration key 800 is represented as an ASCII sequence. The registration key serves to identify the gateway interface device to the remote management server and it also serves to identify the appropriate remote management server to the gateway interface device. The gateway registration key 804 field within registration key 800 provides an identification for the remote management server which generated the registration key and it also provides the means by which the gateway interface device can contact the remote management server for configuration and initialization information once the network connection is established. Once the registration key has been issued by the remote management server and used by the gateway interface device to which it has been assigned, it is marked by the remote management server as a used key. Through this mechanism, a registration key may only be used once. This prevents a subsequent unauthorized use of the registration key by a second user or a user of a cloned gateway interface device.

Once the registration key has been provided to the ISP, the ISP passes that key along to the customer, step 912. In typical situations this is done either over the phone or by fax. In step 912 the ISP also orders a gateway interface device for the customer as well as a data communication interface line, e.g., ISDN or T1 line, for the customer. The customer then receives and installs the gateway interface device and software, step 914. Once the gateway interface device has been physically connected between the client network gateway computer and the phone switch, the first task of the initialization protocol is to locate the gateway on the client network. The problem in this situation is that a device on a network requires an address in order to communicate on the network. However, when a gateway interface device is initially installed and booted up, the addresses of network devices are unknown. One embodiment of the present includes a gateway installation protocol which provides a means for determining device addresses and establishing initial communications between devices on the client LAN. A detailed discussion of the gateway installation protocol (GIP) is provided below, and illustrated by the flow chart of FIG. 13.

Once the client computer and gateway interface device have located the gateway (through the GIP protocol, or other such method), the client accesses the web page embedded provided in the gateway interface device, step 918. The web page is provided by an administrative web service which is built into the gateway interface device. The user then enters the registration key which was provided to him by the ISP in the appropriate field in the web page, step 920. Once the user has typed in the registration key, the gateway interface device decodes the registration key in order to obtain the remote management server ID which is contained in the second field of the registration key. It then initiates a phone call to the remote management server over the network line, step 922. The gateway interface device then establishes a PPP (Point-to-Point) connection to the remote management server through a proprietary authentication scheme, step 924, using the registration key and the gateway interface device serial number. The registration key is unique to the customer and the serial number is unique to the gateway interface device. Thus, the authentication scheme serves to identify the gateway interface device and the customer to the remote management server. The remote management server authenticates the information against information in its customer database by associating the serial number of the gateway interface device with the login key, step 926. In the first step of this process, the remote management server determines whether the registration key has been marked as used. If the registration key has not been marked as used, the remote management server registers the registration key as a valid customer registration. The remote management server then checks the serial number to determine whether the serial number is a validly issued gateway interface device serial number. If so, the serial number and the registration key are stored in the remote management server database to identify the client network.

The remote management server then initiates a remote procedure call (RPC) communication session with the gateway interface device and provides an encryption key. This RPC communication is established by the gateway interface device to request configuration information from the remote management server. As part of this communication session, the remote management server provides a configuration file to the gateway interface device, step 928. In one implementation, the configuration file may be in the form of a script which is executed locally in the gateway interface device, step 932. This step configures the gateway interface device by loading specific parameter values in the appropriate locations of the data store. The gateway interface device writes configuration values into the configuration manager, step 934. Upon completion of the configuration process, the gateway interface device transmits a message to the remote management server verifying successful configuration, step 936. To conclude the initialization process, the remote management server confirms the gateway interface device verification and marks the registration key as used, step 938. This step prevents unauthorized re-use of the registration key.

The use of a remote server to provide initial configuration parameters over a network prevents the need for the client to determine the parameters and input these manually into the gateway interface device himself. Thus, the initialization process serves three basic functions. First, it supplies the configuration information to the client network; second, it associates the gateway interface device and the client network to the remote management server; and third, it provides the remote management server with credentials for providing secure communication in later communication sessions.

Upgrade Procedure

The second protocol for communication between the remote management server and the gateway interface device involves the software upgrade process. In one embodiment of the present invention, the upgrade process involves a full upgrade of the system software residing in the gateway interface device as opposed to a partial upgrade of the system software. The full upgrade thus involves an upgrade of 100% of the bits comprising the gateway interface device software. For example, such an upgrade could be necessary if an entirely new revision of network interface software is made available to client networks. The upgrade process thus ensures that the latest version or a common version of system software is running on all networks supported by a remote management server.

In one embodiment of the present invention, the upgrade process consists of transmitting an upgrade package and three scripts which implement the upgrade procedure. These scripts include a pre-install script, an install script, and a post-install script. For security purposes, the upgrade package is cryptographically authenticated and encrypted.

The first step of the upgrade process involves making the upgrade package available on selected remote server sites which are capable of transmitting files using the TCP/IP file transfer protocol (FTP). These FTP sites provide the upgrade package for download to client networks which request the upgrade. The upgrade package is registered on the remote management server as an available upgrade and the upgrade package is registered with the selected FTP sites, step 1002.

The remote management server sends a notification message to gateway interface device within client networks which are to be upgraded, step 1006. The notification message is a secure message which the remote management server sends only to gateway interface devices which have been predetermined to be qualified for an upgrade. The notification message includes four parameters which have been associated with the upgrade package, step 1004. The first is a fetch time window which specifies the date or time range during which the upgrade package will be made available on the FTP servers; the second is an apply time window which specifies the time at which the upgrade is to be applied within the gateway interface devices; the third parameter is address of the FTP site where the upgrade is available. The final parameter in the notification message is a decryption key to decrypt the software comprising the upgrade package. The notification message itself is encrypted through a cryptographically secure communications protocol (e.g., public/private key encryption).

Figure 11:
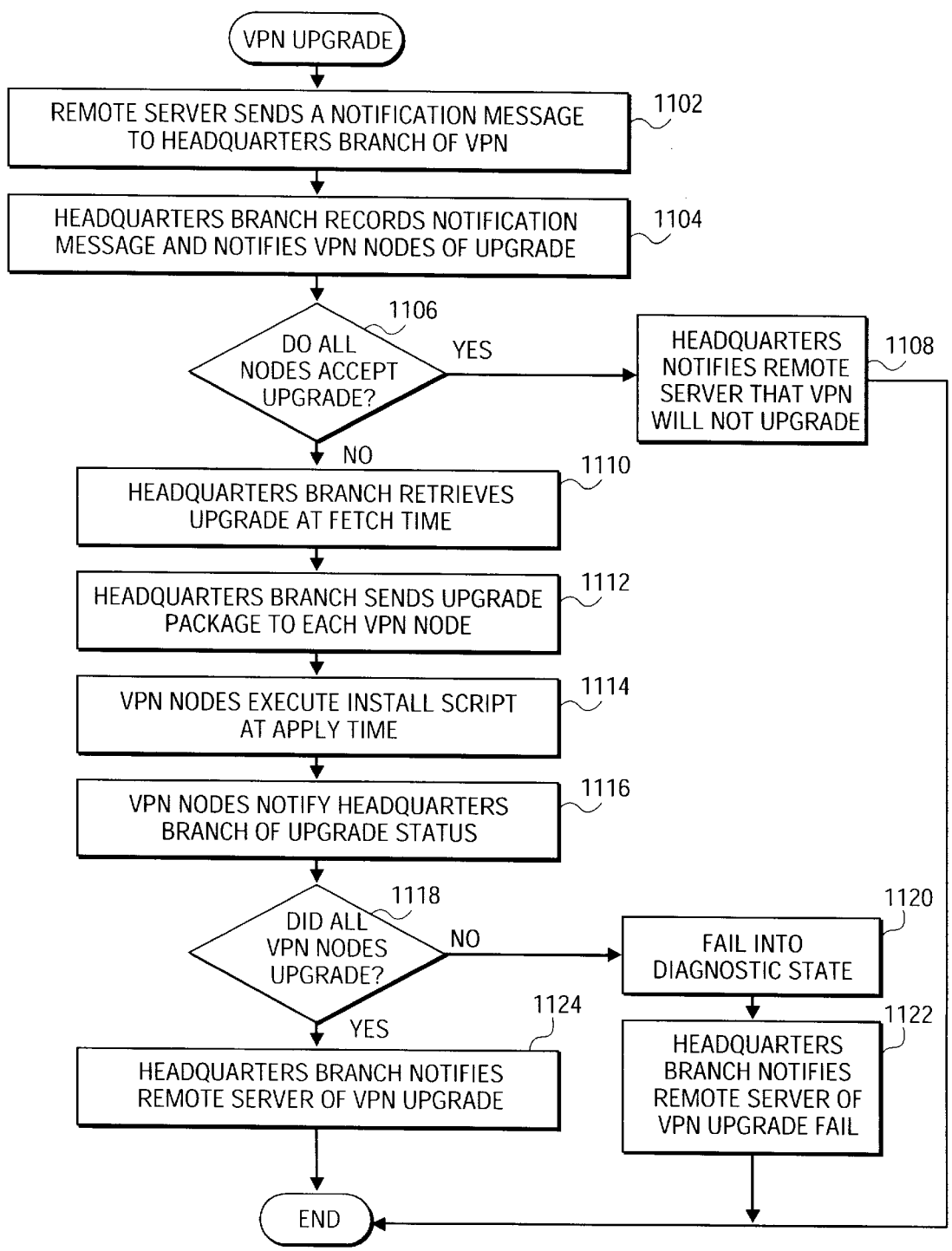
FIG. 11 is a flow diagram illustrating the procedure of upgrading a Gateway Interface Device that is part of a virtual private network according to one aspect of the present invention.

The gateway interface device receives the notification message sent by the remote management server and first checks whether the gateway interface device is part of a virtual private network (VPN), step 1008. If in step 1008 it is determined that the gateway interface device is part of a VPN, the gateway interface device rejects the upgrade notification, step 1010. At this point the gateway interface device must execute a separate upgrade protocol referred to as the VPN upgrade protocol, step 1012. This process is illustrated in FIG. 11.

If, however, it is determined, in step 1008, that the gateway interface device is not part of a VPN, the gateway interface device records the notification message, step 1014. In recording the notification message, the gateway interface device records the information specifying to when to get the upgrade package, where to get the upgrade package from, how to decrypt the package, and when to execute the upgrade operation. At this point the gateway interface device is left to its own to perform the upgrade operation, the remote management server is no longer involved in the normal upgrade procedure.

During the time period specified by the fetch time window, the gateway interface device retrieves the upgrade package from the specified FTP site, step 1016. Upon retrieving the upgrade package, the gateway interface device executes the pre-install script to verify the possibility and appropriateness of the upgrade, step 1018. The pre-install script determines whether it is physically possible to upgrade the software within the gateway interface device. The gateway interface device can reject an upgrade on the basis of factors such as insufficient memory to perform the upgrade, or an attempted upgrade to a software version which is already present on the gateway interface device. The pre-install script ensures that an upgrade operation either completely fails or completely succeeds so that a gateway interface device or a client network is either fully upgraded, or left in the original state with regard to the version of the gateway software.

If the gateway interface device verifies that an upgrade is both possible and appropriate, the gateway interface device executes the install script to apply the upgrade at the time specified by the apply time window, step 1020. The time specified by the applied time window may also be determined or modified by user preference. This allows the user to specify an upgrade during times when the gateway interface device is not subject to heavy network traffic, or is already subject to normal maintenance.

Once the gateway interface device has executed the upgrade, it performs a reboot so that it boots up in the upgraded state. At step 1022, the gateway interface device checks whether the upgrade was successful. If the upgrade fails, the gateway interface device rolls back to its pre-upgrade state, step 1024, and notifies the remote management server of an upgrade problem, step 1026. At this point the upgrade process ends. This diagnostic process for failed upgrade ensures that a gateway interface device is either completely and successfully upgraded or not upgraded at all. In the case of a failed upgrade, the gateway interface device operates with the previous version of the gateway interface software.

If, however, in step 1022 the gateway interface device determines that the upgrade and reboot were successful, the gateway interface device then executes the post-install script and notifies the remote management server of the upgraded status, step 1030. The remote management server stores this upgraded status as part of the configuration information related to that particular gateway interface device. The post-install script contains commands for resolving references within the upgraded software, as well as recording the upgraded version number in appropriate places for the configuration manager.

VPN Upgrade

Figure 10:
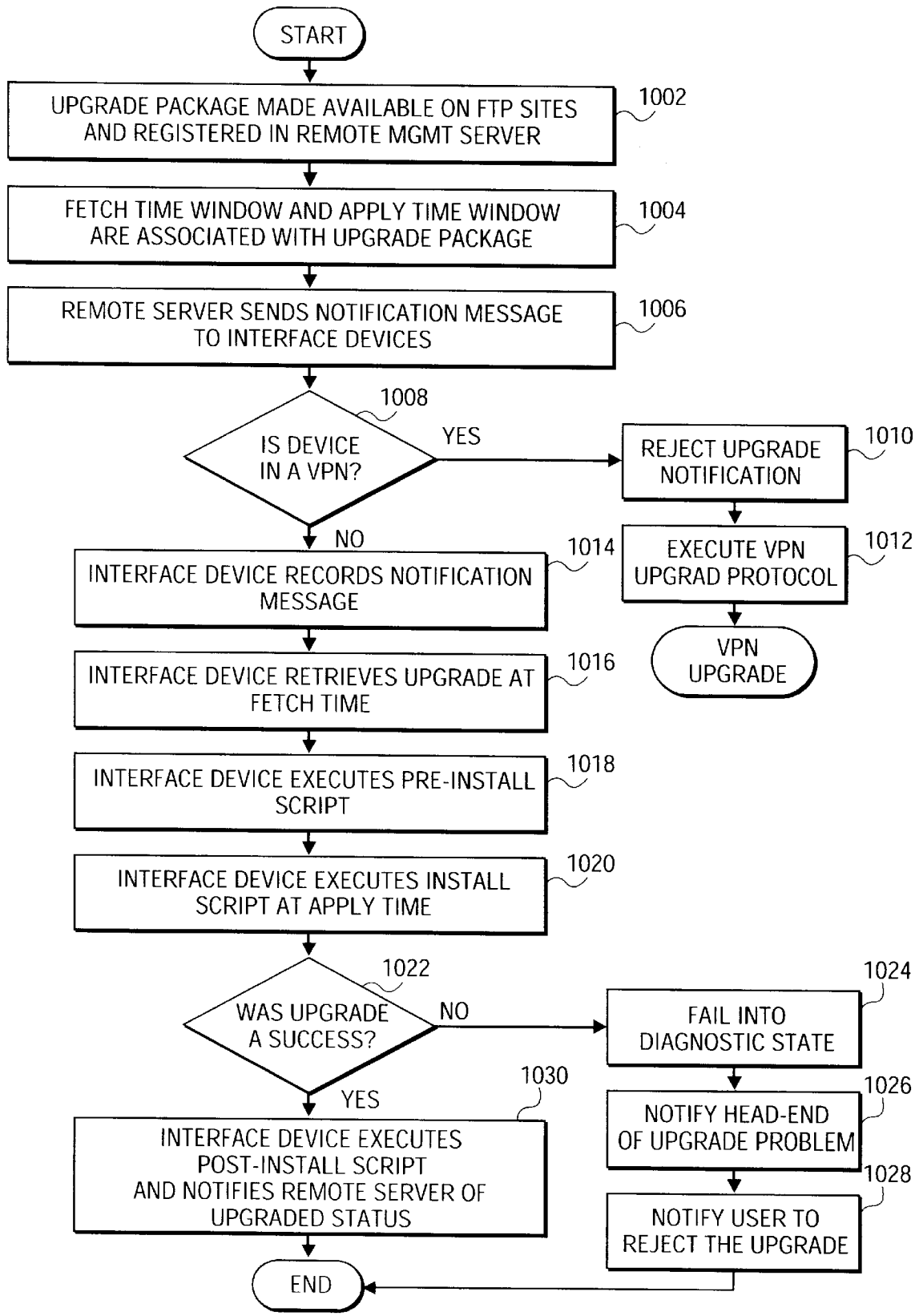
FIG. 10 is a flow diagram illustrating the procedure of upgrading a Gateway Interface Device according to one aspect of the present invention.

If, in step 1008 of FIG. 10, it was determined that the gateway interface device is part of a VPN, the upgrade operation proceeds according to the VPN upgrade protocol illustrated in FIG. 11. A separate VPN upgrade protocol is required because a VPN presents a unique situation in which it is not desirable for only one member of a VPN to be upgraded when other members of the VPN are not upgraded, since this would cause different nodes of the same network to be running different versions of the system software.

In step 1102 of FIG. 11, the remote management server sends a notification message to the headquarters branch of the VPN. The headquarters branch of a VPN is essentially the top level of the VPN. If a non-headquarters branch of a VPN receives an upgrade notification from the remote management server, it will reject the notification. A non-headquarters branch will only accept an upgrade notification from the headquarters branch. The headquarters branch records the notification message and notifies the other VPN nodes of the upgrade, step 1104. In order to successfully upgrade a VPN, all nodes of the VPN must accept the upgrade. In step 1106, it is determined whether all nodes of the VPN accept the upgrade. If one or more nodes of the VPN notifies or returns a negative response to the upgrade, the headquarters branch notifies the remote management server that the VPN will not upgrade, in step 1108, and the VPN upgrade process ends with no upgrade being performed. If, however, in step 1106 it is determined that the nodes of the VPN will accept the upgrade, the headquarters branch retrieves the upgrade package from the specified FTP site at the time specified by the fetch time window, step 1110. The headquarters branch then propagates the upgrade package to each VPN node, step 1112. Each VPN node within the VPN executes the install script to apply the upgrade at the time specified by the apply time window. As in the non-VPN upgrade case, the apply time may be modified by user preference, step 1114. Each VPN node then notifies the headquarters branch of its upgraded status, step 1116.

Because upgrades of the nodes within a VPN must be comprehensive, the headquarters branch checks to verify whether all VPN nodes performed an upgrade, step 1118. If one or more VPN nodes fail to upgrade successfully, the nodes of the VPN will fail into a diagnostic state, step 1120. The headquarters branch will then notify the remote management server of a VPN upgrade failure, step 1122. At that point, the nodes of the VPN will reject the upgrade and revert to usage of the previous version of the gateway interface software. If, however, in step 1118 it is determined that all VPN nodes performed the upgrade procedure successfully, the headquarters branch notifies the remote management server of the VPN upgrade and the remote management server records the upgrade information in its configuration database, step 1124. The process of VPN upgrade protocol then ends with each node of the VPN performing the post-install script to record the new version numbers and new configuration databases.

Reconfiguration

The reconfiguration protocol between the remote management server and the gateway interface device is used when the gateway interface device is to be reconfigured in some manner. Unlike an upgrade which is the substitution of all of the software components within the gateway interface device, reconfiguration involves only an upgrade or changes to parameters in the data store of the gateway interface device. The reconfiguration package made available to a gateway interface device includes only an apply time window. No fetch time window or encryption key is required.

The reconfiguration information is contained within a reconfiguration notification message which notifies the gateway interface device of the availability of reconfiguration parameters. The reconfiguration notification basically comprises operations instructing the addition or deletion of parameter entries within the data store. Therefore, the reconfiguration notification essentially consists of data store operations. A typical reconfiguration operation focuses on a particular group or subset of gateway devices. That is, particular gateways may need to have their systems reconfigured. The reconfiguration protocol provides an easy and efficient means of automatically providing reconfiguration information to the gateway interface devices of the customers. This prevents the need to have Internet Service Providers contact each customer and instruct those customers to change their gateway interface devices in a particular way. In this manner, the customer network gateway interface devices are reconfigured with minimal interaction by either the ISP or the user.

Figure 12:
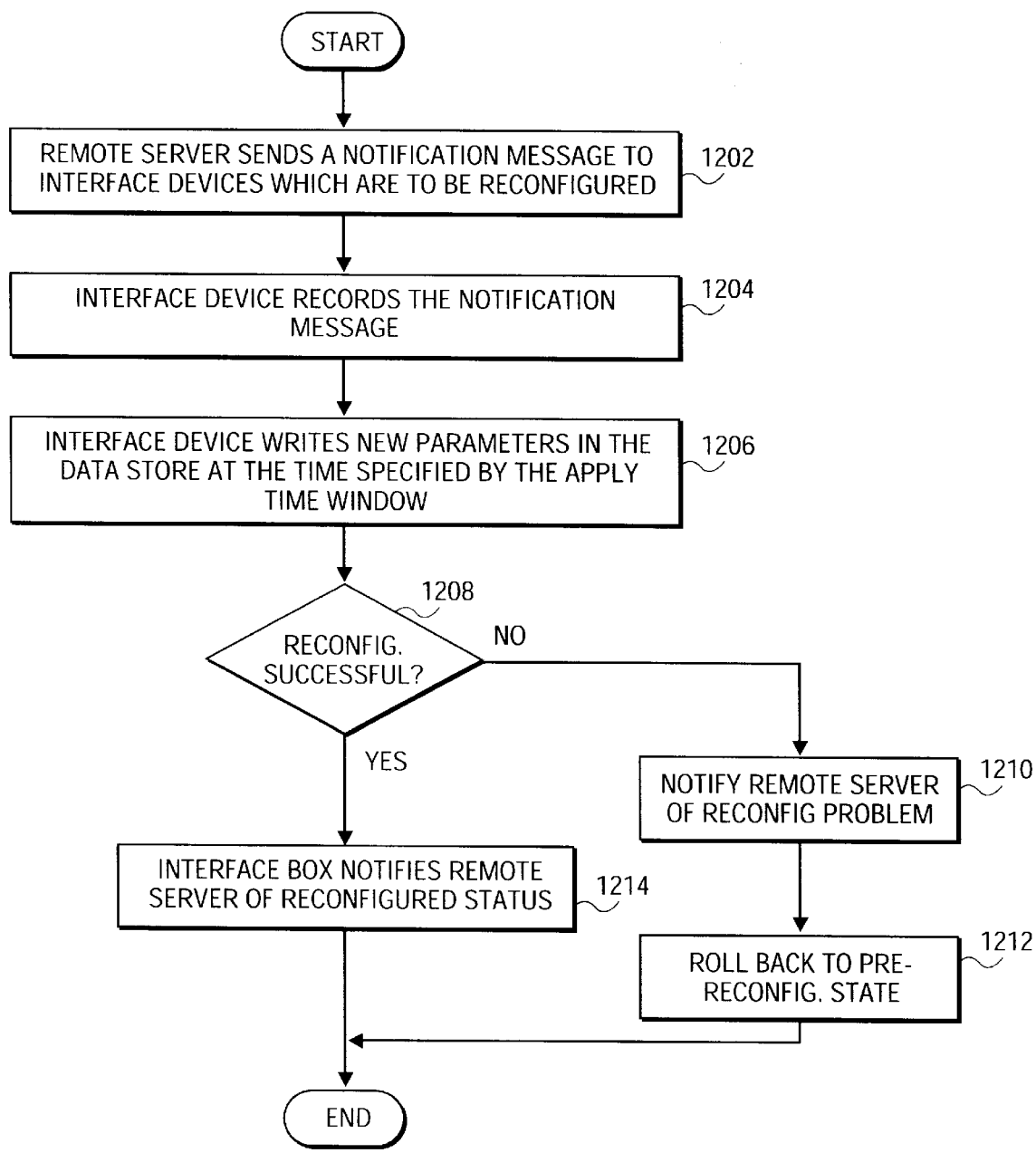
FIG. 12 is a flow diagram illustrating the procedure of reconfiguring a Gateway Interface Device according to one aspect of the present invention.

FIG. 12 is a flow chart which illustrates the reconfiguration process. The reconfiguration process starts with the remote management server sending reconfiguration notification messages to eligible target gateway interface devices, step 1202. In one embodiment of the present invention, the reconfiguration package simply consists of data store operations for new parameters, as well as an apply time window. Upon receiving the reconfiguration notification message, the gateway interface device verifies the reconfiguration request. If the reconfiguration request is not acceptable, the gateway interface device notifies the remote management server. If, however, the reconfiguration request is valid, the gateway interface device records the notification message, step 1204. In step 1206, the gateway interface device writes the new parameters specified in the reconfiguration message to the data store at the time specified by the apply time window. In step 1208 the gateway interface device verifies that the reconfiguration was successful. If the reconfiguration is not successful, the gateway interface device notifies the remote management server of a reconfiguration problem, step 1210, and then automatically rolls back to the state prior to the reconfiguration request, step 1212. If, however, in step 1208 it was determined that the reconfiguration was successful, the gateway interface device notifies the remote management server of its reconfigured status, step 1214.

Security Framework

The trust relationship established between the gateway interface device and the remote management server is implemented through a comprehensive security framework provided by authentication and encryption mechanisms. Except for the initial configuration process, which is performed over a direct phone line, all communications between the gateway and the remote management server are protected by the Secure Sockets Layer (SSL) protocol. SSL supports the upgrade, reconfiguration, and diagnostic protocols. The gateway interface device uses a public key cryptographic algorithm signed Hardware Certificate which adheres to ITU X.509 version 3 (1996) ASN.1 encoding conventions, while the remote management server uses a public key cryptographic algorithm signed Head-End Certificate. This enables both one-way and mutual authentication. Authentication and security are necessary to facilitate reliable gateway interface device identification, remote management server identification, data communication encryption, and software security for programs and data downloaded to a gateway interface device.

The system software within the gateway interface device supports a variety of public key certificates incorporating different cryptographic algorithms for reasons of enhanced security and internationalization.

A Certification Authority issues the certificates which are stored within a gateway interface device. A three level key hierarchy is used for trust separation. Each certificate contains a issuer distinguished name, a subject distinguished name, a validity interval, a serial number, and a public key.

Figure 14:
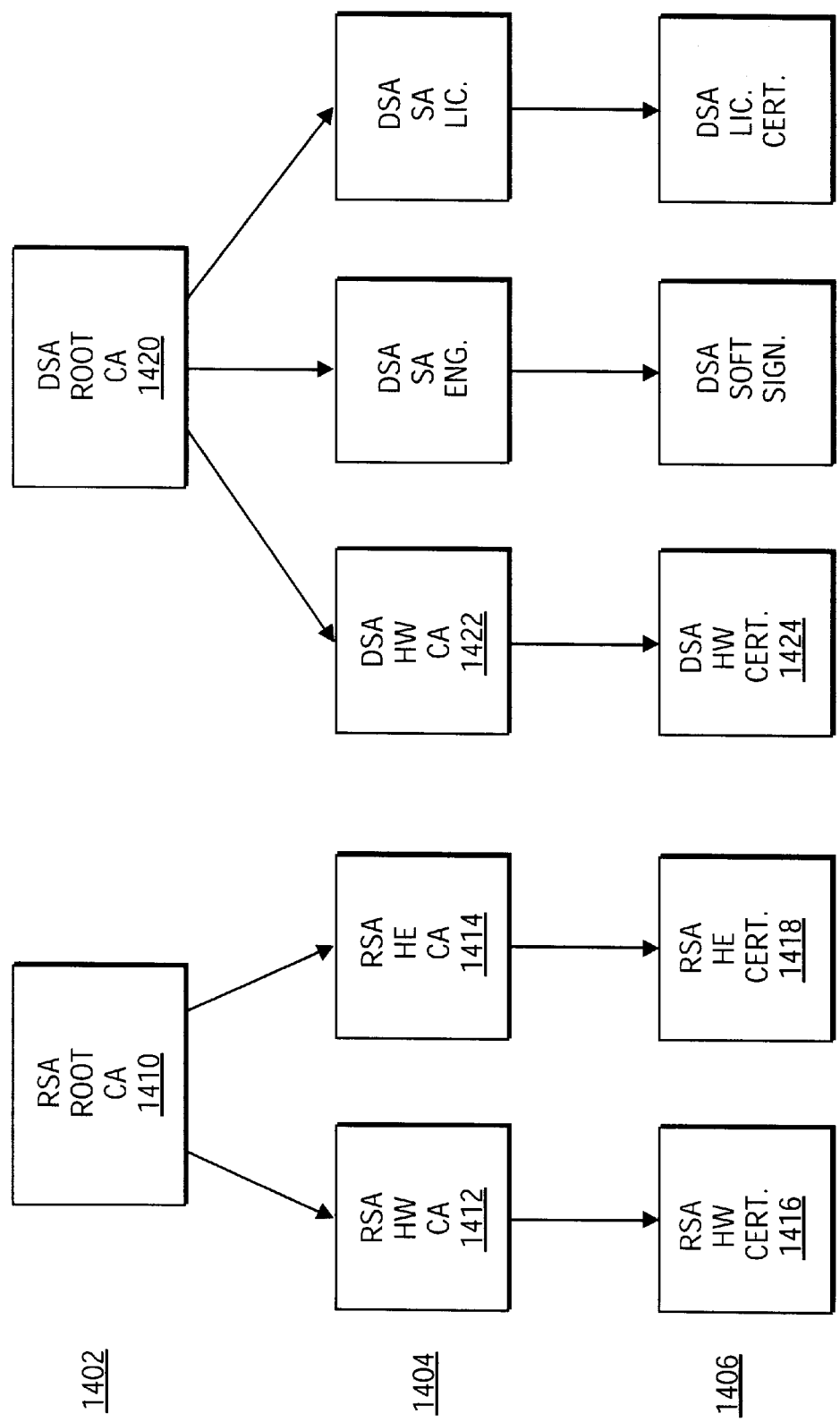
FIG. 14 is a block diagram illustrating an example of a hierarchy of key certificates for the security framework according to one embodiment of the present invention.

FIG. 14 is a block diagram which illustrates one example of a hierarchy of key certificates according to one embodiment of the present invention. The first level of the hierarchy 1402 is the root key certificate level. The gateway interface device stores two root RSA public key certificates and two root DSA public key certificates, with the corresponding private keys. These four certificates are stored in a persistent store, such as the read only memory (EEPROM) 308 within the gateway interface device. The first key of a pair is the primary key, and the second key of a pair is available as a backup.

The root RSA public keys 1410 have corresponding private keys that are used only for occasional signing of next level Public Key Certificates issued by the Certification Authority, and are otherwise maintained in an off-line secure environment only accessible by authorized entities. The root certificates are self-signed and effectively never expire. They are trusted by virtue of being present in a persistent store such as EEPROM.

The root DSA Public Key Certificates 1420 contain discrete log DSA public key values and signatures instead of RSA values. As with the top level RSA keys, top level DSA keys are only used for signing next level DSA Public Key Certificates issued by the Certification Authority, and are afforded similar protection as in the RSA case. The distinguished name and other fields unrelated to keying contain the same information as in the RSA case.

The second level of the hierarchy 1404 are certification keys for Certification Authorities (CA) dedicated to the gateway interface device and the remote management server.

The second level of certificate key hierarchy for the hardware aspect of the gateway interface device is a manufacturing Certificate Authority, referred to as the RSA Hardware CA 1412. This Certificate Authority has an RSA key pair, and its certificate is signed with the root RSA key. The RSA Hardware CA Public Key Certificate 1412 bears the root CA issuer name (primary or secondary) and a subject name. Each gateway interface device is provided with a unique RSA key pair generated during production. The system ROM 308 for each gateway interface device contains a Public Key Certificate signed using an RSA Hardware CA key 1412, along with the corresponding private key. The serial number of the gateway interface device is provided in the certificate as part of the identity.

This certificate is referred to as the RSA Hardware Certificate 1416, which, for the gateway interface device, represents the third level in the certificate key hierarchy. An RSA Hardware Certificate bears the issuer name of the particular manufacturing Certification Authority that signed it; and a subject distinguished name. The data store within the gateway interface device maintains a current RSA Hardware Certificate. The RSA Hardware Certificate 1416 is used in SSL communications where the identity of the gateway interface device needs to be proven, for example when opening a session to a remote management server. It is also used for SSL-secured access to the administrative web server.

The second level of certificate key hierarchy for the remote management server implementation is a remote management Certificate Authority, referred to as the RSA Head-End CA 1414. This Certificate Authority has an RSA key pair, and its certificate is signed with the root RSA key. Each remote management server receives an RSA key pair along with a public key Certificate signed by the RSA Head-End CA. This certificate is known as an RSA Head-End Certificate 1418, which, for the remote management server, represents the third level in the certificate key hierarchy. The RSA Head-End Certificate 1418 is used in SSL communications where the identity of the remote management server needs to be proven, for example when providing upgrade or reconfiguration software packages to a gateway interface device. Remote management servers may specify their own authentication and access policies.

Like the RSA system, the DSA system also includes second and third level key certificates for the gateway interface device. DSA Hardware CA 1422 represents the second level key certificate, and DSA Hardware Certificate 1424 represents the third level key certificate. In addition, the DSA system includes engineering and licensing signed authority certificates for secure communications regarding engineering and licensing activities concerning the gateway interface device.

Except for the root certificates, most certificates are only valid for a fixed period of time and automatically expire after this period (e.g., two years). If, however, a certificate needs to be invalidated prior to its expiration date (for example, in the case of a key compromise), the present invention includes a method for certificate revocation. Most certificates are maintained in the data store of a gateway interface device. A method for revocation utilizes the reconfiguration and update mechanism using Certificate Revocation Lists. A Certificate Revocation List is a time-valued list of serial numbers signed by a Certification Authority.

Gateway Installation Protocol

The gateway installation protocol (GIP) is a minimal User Datagram Protocol (UDP) based protocol designed to solve the problem of bootstrapping the gateway setup process. The user interface for the gateway interface device is delivered to the network client through TCP/IP (which requires an IP address), however when the gateway interface device is initially delivered it is not configured for TCP/IP (it does not have an IP address assigned to it). The gateway installation protocol is designed to bootstrap the gateway interface device into existence on the client network in a safe manner. GIP allows the network client to discover the address assigned to the gateway interface device and then properly configure the gateway interface device with its network address.

When the gateway interface device is in an uninitialized state it initiates a periodic GIP broadcast of an advertisement message indicating its IP address, a URL for access to an administration web server and whether an address provision server (e.g., a DHCP server, DHCP is a network service which provides device addresses upon request) was found on the network. In turn, the gateway interface device expects a GIP message from a client computer on the client LAN. This message can be either a broadcast query message trying to locate a gateway or a directed acknowledgment message indicating that the gateway has been identified by the client computer. When a query message is received by the gateway interface device, it sends back a directed (non-broadcast) advertisement message containing the same information as in the broadcast advertisement. When the gateway interface device receives an acknowledgment, it stops issuing its broadcast advertisement. The acknowledgment should carry an indication of whether the client used a fixed IP address or a DHCP provided address. The client computer is configured use a DHCP address if it did not have a predefined IP address. The client computer listens for any GIP advertisement and may try to initiate GIP query messages if possible in order to reduce wait time. After receiving a GIP advertisement message from the gateway interface device, it sends a directed acknowledgment message back to the gateway interface device and uses the indicated URL to contact the administration web server.

In normal operation, the GIP protocol is also used for new clients to identify the gateway interface device. Client computers issue a broadcast query message and expect an advertisement back. This advertisement carries the URL to be used for administering a new client. Thus, using the GIP, the server listens for a broadcast over the LAN. This operation does not require an address. The server listens for broadcast from the GIP client which is running on the client computer. The GIP client is basically broadcasting whether there are any gateways on the LAN. The GIP, in this situation, has first checked to see whether there are any services on the network which provide automatically IF addresses, such as DHCP. At this point, a temporary address is assigned to the gateway interface device.

Figure 13:
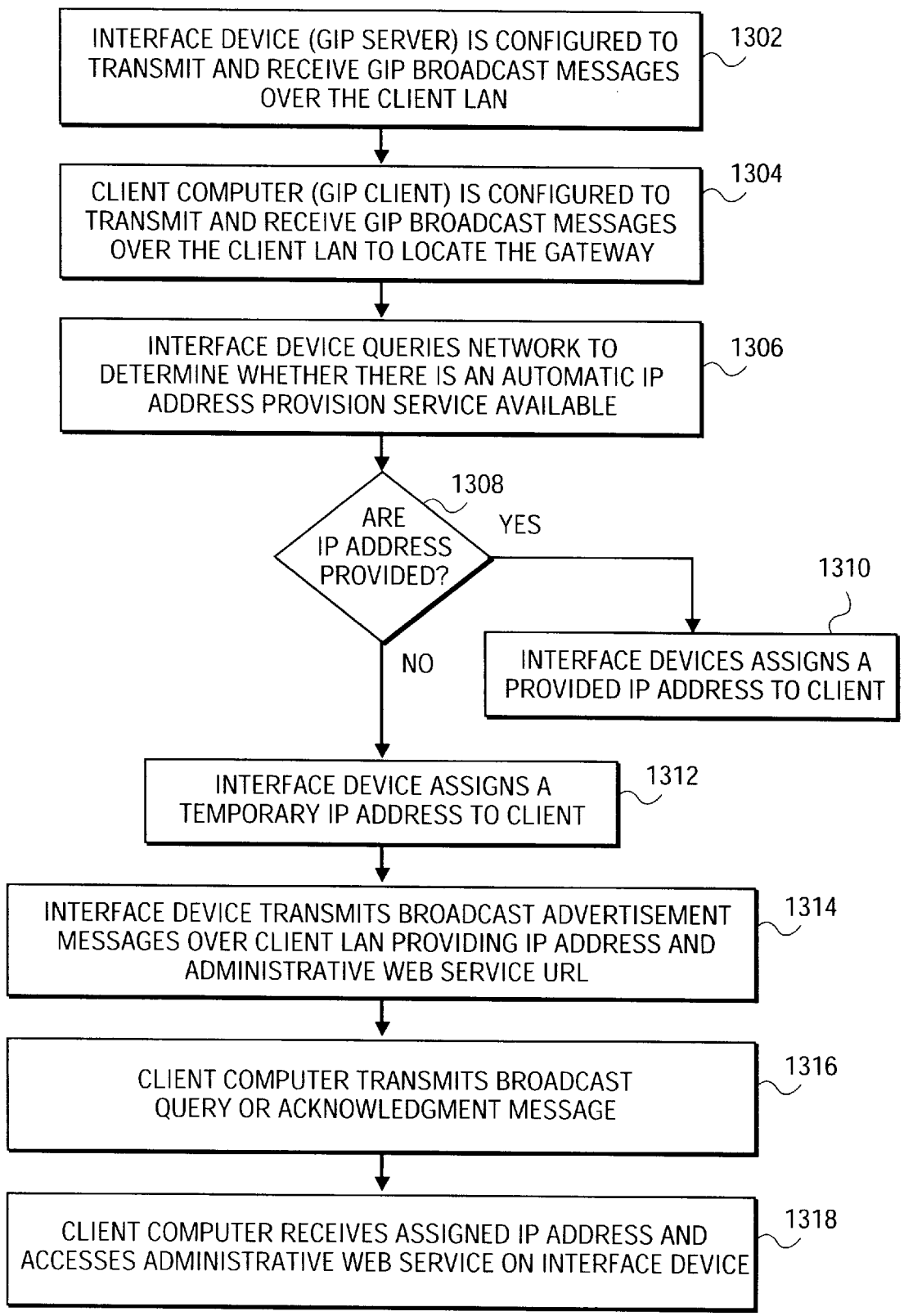
FIG. 13 is a flow diagram illustrating the determination of network addresses by a client computer according to one aspect of the present invention.

FIG. 13 is a flow chart which illustrates the process of determining a gateway address using the Gateway Installation Protocol. In steps 1302 and 1304, the gateway interface device and gateway computer are configured to communicated GIP messages over the client LAN. The gateway interface device is referred to as the GIP server, and the gateway computer is referred to as the GIP client for purposes of GIP communications.

The gateway interface device first queries the LAN to determine whether an automatic IP address service (e.g., DHCP) is available, step 1306. If in step 1308 it is determined that an IP address service is not available, the gateway interface device will assign a temporary IP address to the gateway. If it is determined in step 1308 that an IF address service is available, however, the gateway interface device will assign the IP address provided by the service to the gateway, step 1310. In an alternative embodiment of the present invention, the user will be advised to disable any such address provision service, so that a temporarily assigned IP address will always be used upon initial configuration.

Once a gateway address (temporary or assigned) has been associated with the gateway, the gateway interface device transmits a GIP broadcast advertisement message over the client LAN, step 1314. The GIP broadcast advertisement message contains the gateway address, as well as a URL for the administrative web service. In the meantime, the client may transmit a broadcast query or acknowledgment message, step 1316. The query message is a message from a client computer indicating that the client computer is trying to locate the gateway. When a query message is received by the gateway interface device, it sends back a directed (non-broadcast) advertisement message containing the same information as in the broadcast advertisement. In response to a directed or non-directed GIP advertisement message, the gateway computer transmits a GIP acknowledgment message. The acknowledgment message indicates that the gateway has been identified by the client computer. Upon receipt of an acknowledgment, the gateway interface device stops issuing the broadcast advertisement. Once the gateway has been identified by the client computer, it accesses the administrative web service URL contained in the advertisement message, step 1318.

Thus, a method and apparatus have been described for allowing the remote initialization, configuration and upgrade of a network interface device. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method of reconfiguring a network interface device coupled between a first network and a second network, said method comprising:

associating a first time window with a reconfiguration notification message;

initiating reconfiguration of the network interface device by a remote server; and sending said reconfiguration notification message to said network interface device if said network interface device is eligible for reconfiguration, wherein said reconfiguration notification message is sent through a public key/private key encryption mechanism established between said remote server and said network interface device.

2. The method of claim 1 wherein said reconfiguration notification message contains replacement data parameters for modification of data entries stored in a database within said network interface device.

3. The method of claim 2 wherein:

upon receipt of said reconfiguration notification message and within the time specified by said first time window, said network interface device writes said replacement data parameters to corresponding data entry locations within said database.

4. The method of claim 3 further comprising:

determining, in said network interface device, whether the writing of said replacement data parameters was successful;

transmitting, from said network interface device, a first notification message to a server if reconfiguration was successful; and transmitting, from said network interface device, a second notification message to said server if said reconfiguration was not successful.

5. The method of claim 2 wherein said reconfiguration notification message is transferred through a public key/private key encryption mechanism established between a server and said network interface device.

6. An article of manufacture embodying a program of instructions executable by a machine for reconfiguring a network interface device coupled between a first network and a second network, the program of instructions including instructions for:

associating a first time window with a reconfiguration notification message;

initiating reconfiguration of the network interface device by a remote server; and sending said reconfiguration notification message to said network interface device if said network interface device is eligible for reconfiguration, wherein said reconfiguration notification message is sent through a public key/private key encryption mechanism established between said remote server and said network interface device.

7. An article of manufacture according to claim 6, wherein said program of instructions further includes instructions for:

programming said reconfiguration notification message with replacement data parameters for modification of data entries stored in a database within said network interface device;

writing said replacement data parameters to corresponding data entry locations within said database upon receipt of said reconfiguration notification message and within the time specified by said first time window.

8. The article of manufacture according to claim 7, wherein said program of instructions further includes instructions for:

determining, in said network interface device, whether the writing of said replacement data parameters was successful;

transmitting, from said network interface device, a first notification message to a server if reconfiguration was successful; and transmitting, from said network interface device, a second notification message to said server if said reconfiguration was not successful.

9. A method of upgrading software on a network interface device coupled between a first network and a second network, the method comprising:

identifying a first time window and a second time window for an upgrade notification message;

determining whether the network interface device is a part of a virtual private network (VPN);

if the network interface device is the part of the VPN, sending the upgrade notification message to a headquarters branch of the VPN, wherein the upgrade notification message directs the headquarters branch to retrieve an upgrade package from a remote site specified in the notification message within the first time window and further directs each node within the VPN to upgrade software at any time within the second time window.

10. The method of claim 9 wherein the first time window specifies a time period for retrieving an upgrade package and the second time window specifies a time period for upgrade using the upgrade package.

11. The method of claim 9 further comprising:

determining that the network interface device is not a part of the virtual private network;

retrieving an upgrade package from a remote site specified in the notification message any time within the first time window; and upgrading software on the network interface device using the upgrade package at any time within the second time window.

12. The method of claim 9 further comprising:

determining that all nodes of the VPN have accepted the upgrade;

retrieving an upgrade package from a remote site specified in the notification message any time within the first time window;

sending the upgrade package to each node within the VPN; and performing the upgrade of the VPN at any time within the second time window.

13. A system comprising:

a first network;

a second network;

a network interface device coupled between the first network and the second network; and a server coupled to the first network and the network interface device, the server configured to initiate reconfiguration of the network interface device and to provide reconfiguration information to the network interface device if the network interface device is eligible to receive the reconfiguration information, wherein said reconfiguration notification message is sent through a public key/private key encryption mechanism established between a remote server and said network interface device, the reconfiguration information being associated with a first time window.

14. The system of claim 13 wherein the reconfiguration information contains replacement data parameters for modification of data entries stored in a database within the network interface device.

15. The system of claim 14 wherein the network interface device writes the replacement data parameters to corresponding data entry locations within the database upon receipt of the reconfiguration information and within a time period specified by the first time window.

16. The system of claim 15 wherein the network interface device is configured to determine whether the writing of said replacement data parameters was successful, transmit a first notification message to the server if execution of a reconfiguration program was successful, and transmit a second notification message to the server if execution of the reconfiguration program was not successful.

17. The system of claim 14 wherein the reconfiguration information is transferred through a public key/private key encryption mechanism established between the server and the network interface device.

18. A system comprising:

a first network;

a second network;

a network interface device coupled between the first network and the second network: and a server coupled to the first network and the network interface device, the server configured to identify a first time window and a second time window for an upgrade notification message, to determine whether the network interface device is a part of a virtual private network (VPN) and, if the network interface device is the part of the VPN, to send the upgrade notification message to a headquarters branch of the VPN, wherein the upgrade notification message directs the headquarters branch to retrieve an upgrade package from a remote site specified in the upgrade notification message within the first time window and further directs each node within the VPN to upgrade software at any time within the second time window.

19. The method of claim 18 wherein the first time window specifies a time period for retrieving the upgrade package and the second time window specifies a time period for the upgrade using the upgrade package.

20. The system of claim 18 wherein the network interface device is configured to retrieve the upgrade package at a time period within the first time window and perform the upgrade using the upgrade package at a time period within the second time window, if the network interface device is not a part of a virtual private network (VPN).

21. The system of claim 18 further comprising a virtual private network (VPN) coupled to the server, the VPN comprising a headquarters branch and a plurality of nodes including the network interface device.

22. The system of claim 21 wherein the headquarters branch of the VPN is configured to receive the upgrade notification message from the server, notify the nodes of upgrade, and send an upgrade package to the nodes if all the nodes accept the upgrade.

23. An article of manufacture embodying a program of instructions executable by a machine for initializing a network interface device coupled between a first network and a second network, the program of instructions including instructions for:

associating a first time window and a second time window with an upgrade notification message; and sending the upgrade notification message to the network interface device if the network interface device is eligible for an upgrade, wherein said reconfiguration notification message is sent through a public key/private key encryption mechanism established between a remote server and said network interface device.

* * * * *

UNITED STATES PATENT AND TRADEMARK OFFICE
CERTIFICATE OF CORRECTION

PATENT NO. : 6,496,858 B1
DATED : December 17, 2002
INVENTOR(S) : Frailong et al.

It is certified that error appears in the above-identified patent and that said Letters Patent is hereby corrected as shown below:

Column 21,
Line 7, delete "IF" and insert -- IP --.
Line 22, delete "IF" and insert -- IP --.

Signed and Sealed this

Third Day of June, 2003

JAMES E. ROGAN
*Director of the United States Patent and Trademark Office*

UNITED STATES PATENT AND TRADEMARK OFFICE
CERTIFICATE OF CORRECTION

PATENT NO.   : 6,496,858 B1
DATED        : December 17, 2002
INVENTOR(S)  : Frailong et al.

It is certified that error appears in the above-identified patent and that said Letters Patent is hereby corrected as shown below:

Column 21,
Line 7, delete "IF" and insert -- IP --.
Line 22, delete "IF" and insert -- IP --.

Column 22,
Line 28, delete
"5. The method of claim 2 wherein said reconfiguration notification message is transferred through a public key/private key encryption mechanism established between a server and said network interface device."

Column 24,
Line 12, delete
"17. The system of claim 14 wherein the reconfiguration information is transferred through a public key/private key encryption mechanism established between the server and the network interface device."

Signed and Sealed this

Twenty-fifth Day of November, 2003

JAMES E. ROGAN
*Director of the United States Patent and Trademark Office*